United States Patent [19]
Mizuno et al.

[11] Patent Number: 5,276,509
[45] Date of Patent: Jan. 4, 1994

[54] MULTI-COLOR FACSIMILE APPARATUS HAVING DIFFERENT DATA PREPARATION AND TRANSMISSION MODES AND DATA PREPARATIONS AND TRANSMISSION METHOD PRACTICED BY THE APPARATUS

[75] Inventors: Shujiro Mizuno, Nagoya; Hitoshi Uno, Gifu; Junji Hatamura; Kazunobu Asai, both of Nagoya; Eiichi Ohta, Handa; Hidetoshi Yano, Nagoya; Hiroya Inagaki, Suginami; Kouichi Mino, Kodaira, all of Japan

[73] Assignees: Brother Kogyo Kabushiki Kaisha, Nagoya; Nippon Telegraph and Telephone Corporation, Tokyo, both of Japan

[21] Appl. No.: 319,475

[22] Filed: Mar. 6, 1989

[30] Foreign Application Priority Data

Mar. 11, 1988 [JP] Japan .............. 63-33074[U]
Mar. 11, 1988 [JP] Japan .............. 63-58971

[51] Int. Cl.⁵ .......................................... G03G 15/00
[52] U.S. Cl. ................................ 358/500; 358/474
[58] Field of Search ............ 358/75, 78, 261.1, 261.2, 358/296, 400, 426, 427, 430, 434, 438, 439, 471, 474, 476, 494, 496, 498, 298; 346/76; 355/230, 231, 308, 309

[56] References Cited

U.S. PATENT DOCUMENTS

| | | | |
|---|---|---|---|
| 4,442,452 | 4/1984 | Kurata et al. | 358/75 |
| 4,523,831 | 6/1985 | Yokoo et al. | 355/231 |
| 4,636,871 | 1/1987 | Oi | 358/296 |
| 4,682,215 | 7/1987 | Adachi | 358/75 |
| 4,724,460 | 2/1988 | Shinyashiki | 355/308 |
| 4,729,036 | 3/1988 | Ikeda et al. | 346/76 PH |
| 4,748,680 | 3/1988 | Margolin | 358/75 |
| 4,764,788 | 8/1988 | Watashi et al. | 355/231 |
| 4,768,100 | 8/1988 | Kunishima et al. | 358/498 |
| 4,814,798 | 3/1989 | Fukae et al. | . |
| 4,833,547 | 5/1989 | Mase | 358/400 |
| 4,835,619 | 5/1989 | Kobori et al. | 358/498 |
| 4,862,289 | 8/1989 | Shimada | 358/474 |
| 4,914,525 | 4/1990 | Abe et al. | 358/474 |
| 4,962,526 | 10/1990 | Kotani et al. | . |
| 4,985,736 | 1/1991 | Kawano et al. | 355/309 |
| 5,140,438 | 8/1992 | Kurahashi et al. | . |

FOREIGN PATENT DOCUMENTS

| | | | |
|---|---|---|---|
| 55-138973 | 10/1980 | Japan | 358/75 |
| 57-119567 | 7/1982 | Japan | . |
| 58-46762 | 3/1983 | Japan | 358/75 |
| 60-80371 | 5/1985 | Japan | 358/435 |
| 60-97771 | 5/1985 | Japan | 358/75 |
| 60-31388 | 7/1985 | Japan | . |
| 61-123281 | 6/1986 | Japan | . |

*Primary Examiner*—Stephen Brinich
*Attorney, Agent, or Firm*—Oliff & Berridge

[57] ABSTRACT

A method and apparatus for transmitting code data of a multi-color subject copy from a transmitter to a receiver in a manner that minimizes the volume of code data. The form of the data is determined by the capabilities of the receiver. The original images consist of at least two colors in addition to the background color of the copy sheet. A transmitter scans each line of the copy sheet to develop scan signals corresponding to the original images. The scan signals are used to prepare sets of run length code data and color discrimination code data indicative of the colors which appear in each line of the subject copy sheet. The transmitter transmits color discrimination code data and the corresponding set of run length code data to a receiver adapted to reproduce the transmitted data. The method of combining the scan signals to create the transmitted image signals and color discrimination code produce a condensed data strength.

45 Claims, 12 Drawing Sheets

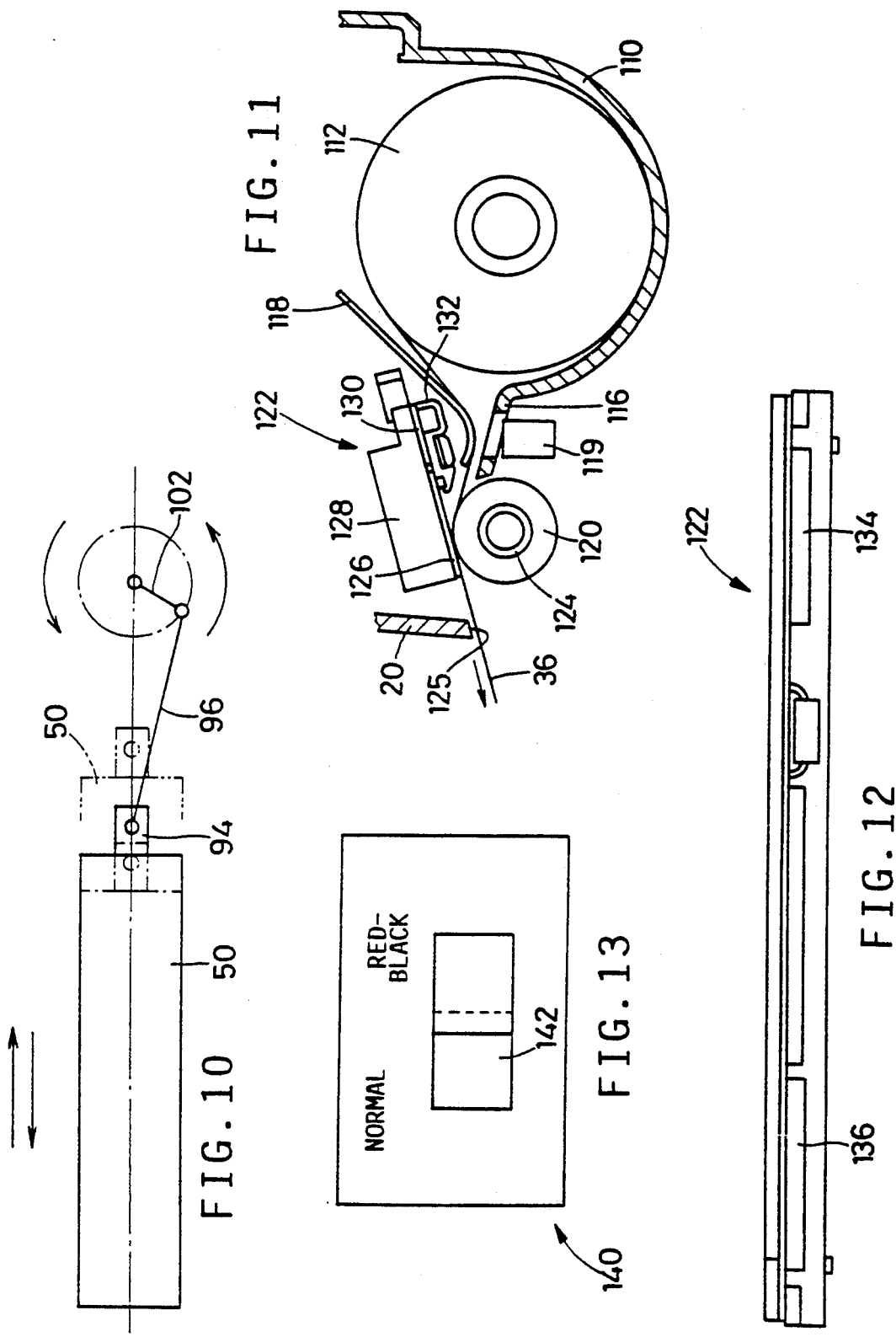

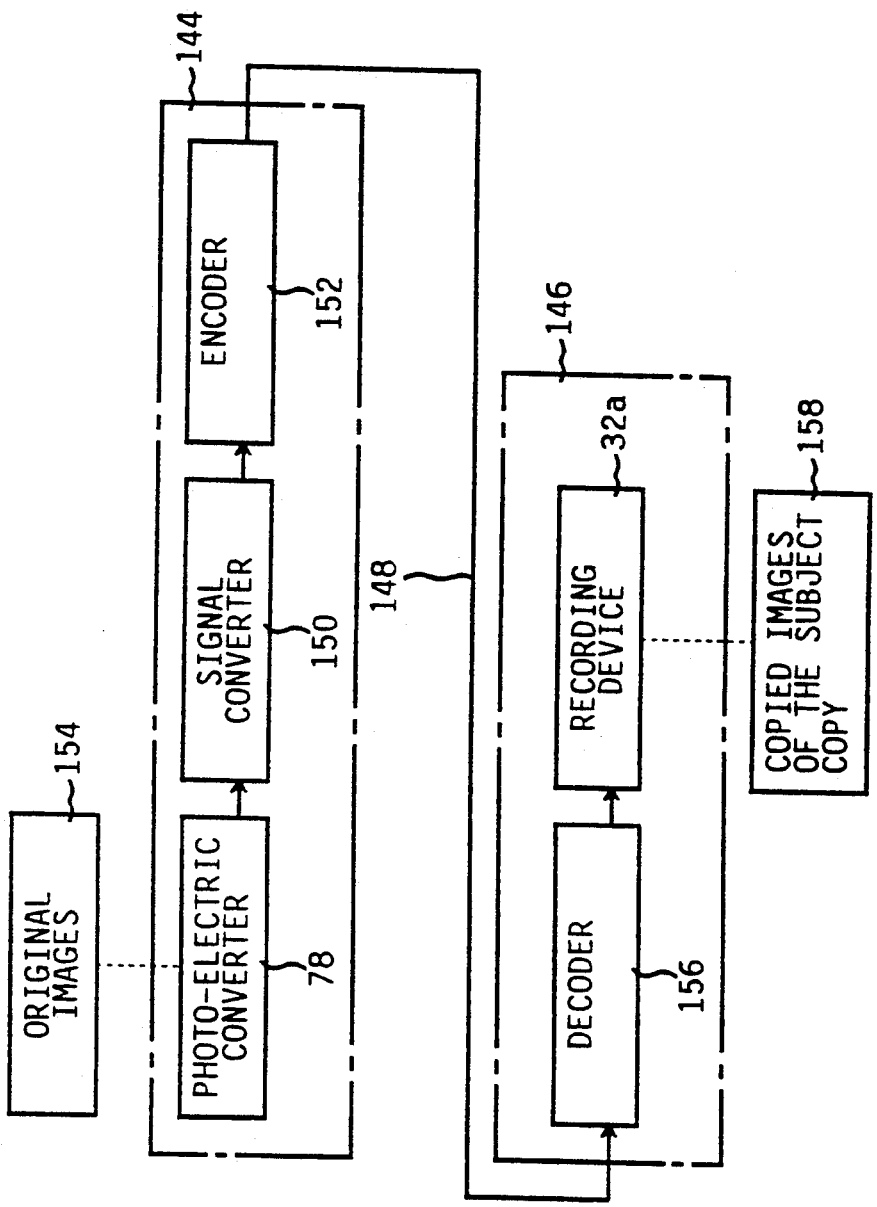

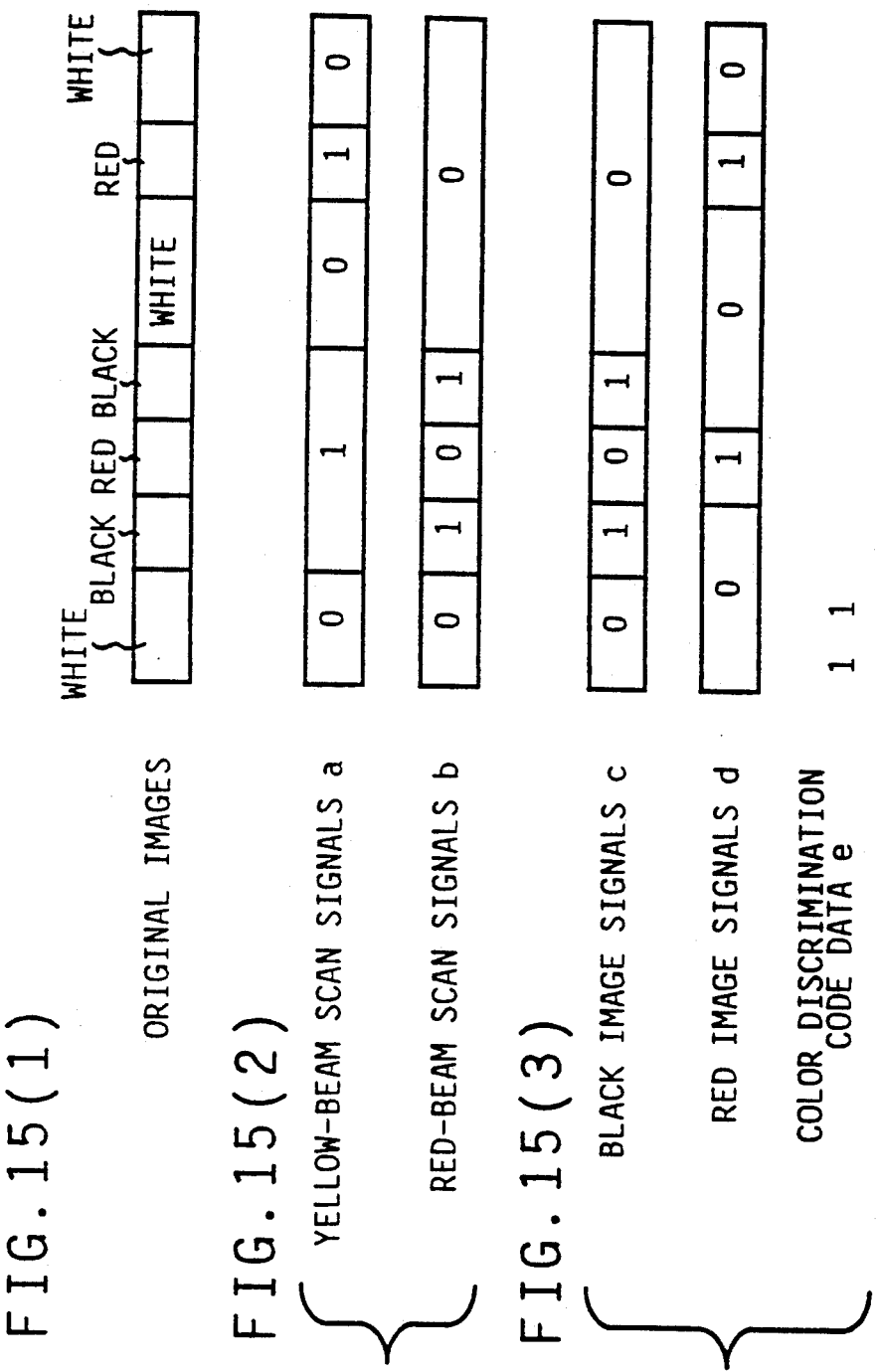

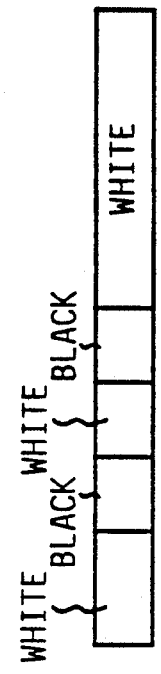
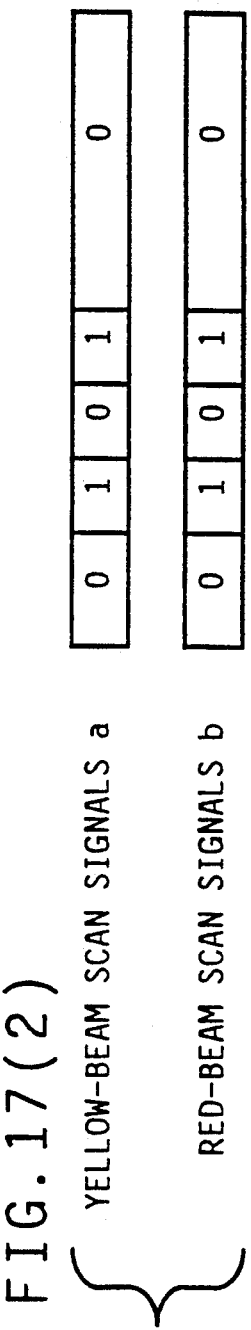
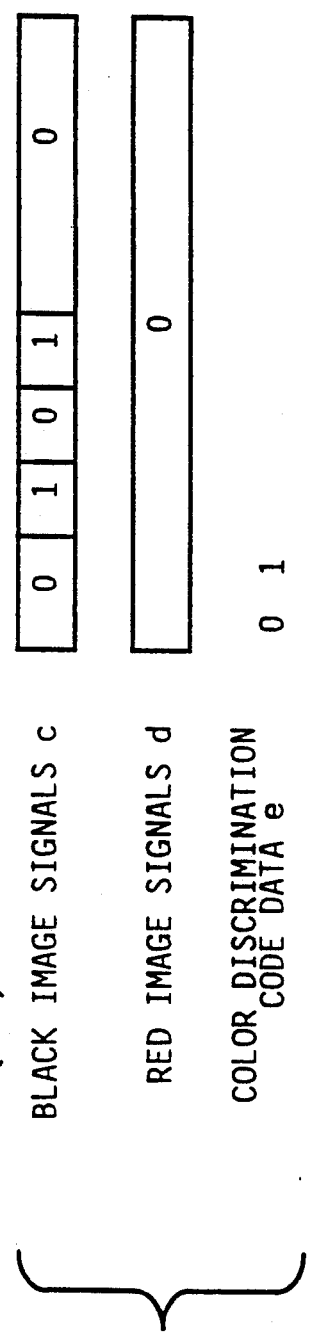
FIG. 17(1) ORIGINAL IMAGES
FIG. 17(2) YELLOW-BEAM SCAN SIGNALS a
RED-BEAM SCAN SIGNALS b
FIG. 17(3) BLACK IMAGE SIGNALS c
RED IMAGE SIGNALS d
COLOR DISCRIMINATION CODE DATA e

FIG. 18(1) ORIGINAL IMAGES
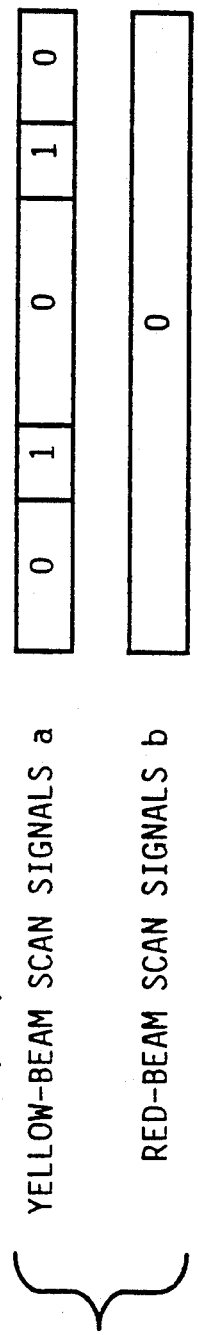
FIG. 18(2)
YELLOW-BEAM SCAN SIGNALS a
RED-BEAM SCAN SIGNALS b
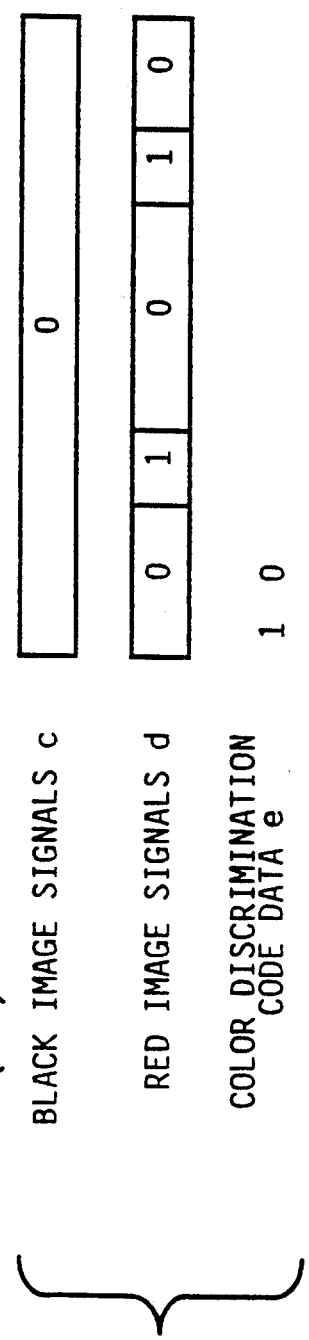
FIG. 18(3)
BLACK IMAGE SIGNALS c
RED IMAGE SIGNALS d
COLOR DISCRIMINATION CODE DATA e FIG.19(1) ORIGINAL IMAGES 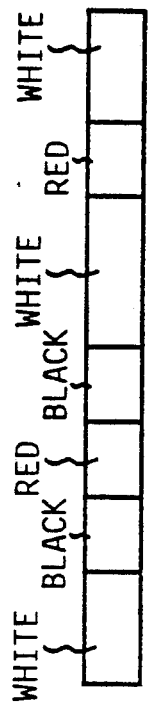
FIG.19(2) YELLOW-BEAM SCAN SIGNALS a / RED-BEAM SCAN SIGNALS b 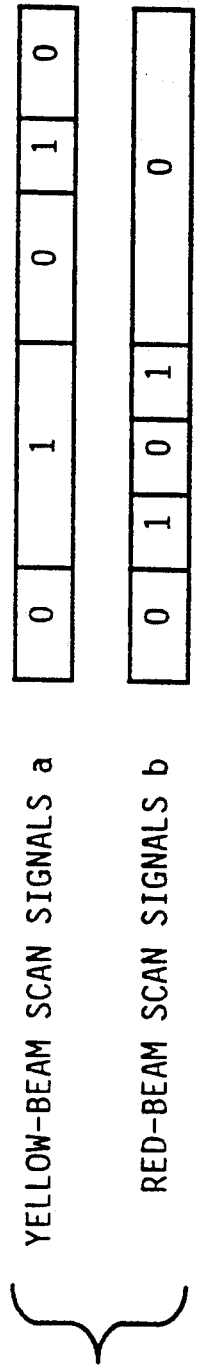
FIG.19(3) BLACK AND RED IMAGE SIGNALS c' / RED IMAGE SIGNALS d' / COLOR DISCRIMINATION CODE DATA e 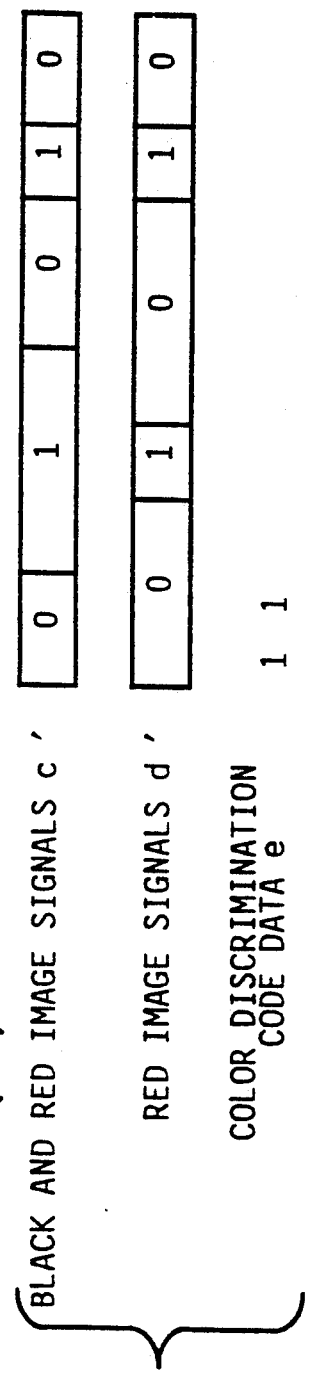

MULTI-COLOR FACSIMILE APPARATUS HAVING DIFFERENT DATA PREPARATION AND TRANSMISSION MODES AND DATA PREPARATIONS AND TRANSMISSION METHOD PRACTICED BY THE APPARATUS

BACKGROUND OF THE INVENTION

1. Field of the Invention

The present invention relates to a method and an apparatus adapted to prepare coded signals indicative of images of three or more colors of a subject copy, for transmission to a remote apparatus such as a remote facsimile receiver, for reproduction of the subject copy, and an apparatus operable to effect a recording on different types of recording medium, based on such coded signals.

2. Discussion of the Prior Art

An example of such a signal transmission method as indicated above is disclosed in Publication No. 60-31388 of examined Japanese Patent Application (published for opposition purpose), wherein run-length code data indicative of black and white images of a subject copy, which is prepared for delivery to a remote recording apparatus, is utilized to transmit images of another color such as a red color. According to the disclosed method, a red-colored area along a line of original images is represented by a run-length code indicative of the length of the red-colored area, and a flag code and a one-bit control code which precede that run-length code. The flag code is indicative of the red color, while the one-bit control code indicates whether the run-length code of the red-colored area is prepared based on the run-length coding for the black images or run-length coding for white images. The flag code is a run-length code which is usually never used, for instance, the run-length code representative of the run-length of "0" of a black-colored area.

Also, laid-open Publication No. 61-123281 of unexamined Japanese Patent Application discloses a method adapted for transmission of a four-color subject copy which includes green and red images other than black and white images. This method is based on a proposition that run-length codes for the white images and run-length codes for the black images are transmitted alternately. The green and red images are represented by flag codes which are combinations of the run-length code for the run length of "0" of a white colored area, and the run-length codes for black-colored areas. The flag codes represent the green-and red-colored areas, depending upon which one of the two codes of each flag code precedes the other or comes first.

The methods proposed in the above-identified publications are effective to reduce the volume of data that should be transmitted, and permit the transmission of a subject copy involving images of three or more colors, in a relatively short period of time. However, the volumetric reduction of the required image transmission data according to the proposed method is still insufficient. For example, even where a line of original images consisting of only white and red images (i.e., red images on a white background color of a subject copy sheet), run-length codes for red-colored areas should always be preceded by flag codes that indicate that the following run-length codes are those for the red-colored areas. Accordingly, the overall volume of the image data to be transmitted tends to be large.

On the other hand, laid-open Publication No. 57-119567 proposes to further reduce the volume of the required image data, by using a color-shift code only when the color of the image areas is changed. For instance, the color-shift code may be the run-length code representative of the run length of "0" of a white- or black-colored area, or a combination of these two run-length codes.

The method according to the above proposal does not require each of the run-length codes for red-colored areas to be accompanied by an appropriate flag code which indicates that the run-length code is that for a red-colored area. Accordingly, a further volumetric reduction of the required image data is achieved.

Usually, a recording apparatus such as a remote facsimile receiver which effects a recording based on received image signals such as run-length code data as described above is operated in different modes depending upon types of a recording medium. For example, a thermo-sensitive recording medium has one or more coloring layers formed on a substrate. Each coloring layer is colored when heated to a predetermined temperature, whereby a recording is accomplished by selectively heating local areas or spots on the medium. The coloring layers corresponding to two or more colors other than the background color (usually whitish color) of the medium have different coloring temperatures. Namely, the amounts of thermal energy necessary to color the different coloring layers are different. Therefore, the recording of images in desired colors requires the use of a thermo-sensitive medium having appropriate coloring layers, and the heating of these coloring layers with necessary amounts of thermal energy. To this end, the recording apparatus should have different operation modes depending upon the specific types of the thermo-sensitive recording medium.

A recording apparatus capable of receiving different types of thermo-sensitive recording medium as indicated above is known. For example, there is known a facsimile apparatus "RIFAX 810SR" available from RICOH (a Japanese manufacturer) which is operable in a black-and-red mode in which both black and red images can be recorded, as well as in a black mode in which only black images can be recorded. In this facsimile apparatus, the recording of black images is effected on a thermo-sensitive paper which has a black coloring layer on a substrate, while the recording in black and red colors is effected on a thermo-sensitive paper having a black coloring layer and a red coloring layer. The recording device of the apparatus operates in the two different modes which are selected depending upon the type of the paper currently used, so that the coloring layer or layers may be heated with the appropriate amount or amounts of thermal energy necessary to effect the intended recording operation in the desired color or colors.

The facsimile apparatus indicated above has a cavity or space provided in the apparatus body for accommodating a roll of the desired one of the two types of a thermo-sensitive web. The opening leading to the cavity is usually closed by a pivotable top cover, whereby the roll of web is not visible from the outside during the use of the apparatus. With the roll of the desired type of the thermo-sensitive web set in position, the recording device is placed in one of the two recording modes that suits the currently used type of the web. The recording modes are established or changed by using a plurality of keys on an operator's control panel provided on the outer surface of the apparatus body.

Certainly, the keys on the control panel serve the other purposes for controlling the apparatus. Therefore, when the recording web is changed from one type to the other, the keys must be operated repeatedly in the predetermined order. Thus, the procedure to control the apparatus is difficult to understand and cumbersome, and may be erroneously performed. This problem generally exists in a recording apparatus which selectively uses different types of recording medium (e.g., different sizes of medium) and which is operated in the correspondingly selected different modes.

SUMMARY OF THE INVENTION

It is therefore a first object of the present invention to provide a method of transmitting code data of a multicolor subject copy from a transmitter to a receiver, in a manner that minimizes the volume of the code data.

A second object of the invention is the provision of an apparatus, in particular, a facsimile apparatus, suitable for practicing the method indicated above.

A third object of the invention is to provide such an apparatus which has an operator-controlled member that is conveniently located for easy and correct operation for selecting an operation mode which corresponds to the type of a recording medium currently set in the apparatus.

The above first object may be achieved according to one aspect of the present invention, which provides a method of transmitting original images on a subject copy sheet, from a transmitter to a receiver, the original images having at least two colors other than a background color of the copy sheet, the method comprising the steps of: operating the transmitter to scan each line of the subject copy sheet, thereby preparing a plurality of sets of run-length code data corresponding to the original images, and color discrimination code data indicative of at least one of the at least two colors which appeared in the each line of the subject copy sheet, the sets of run-length code data being converted or convertible into image signals corresponding to the at least two colors; transmitting together with the color discrimination code data, from the transmitter to the receiver, only each of at least one of the plurality of sets of run-length code data, which at least one set corresponds to the at least one color which appeared in each line of the subject copy sheet; and operating the receiver to reproduce each line of the subject copy sheet, based on the color discrimination code data and the at least one set of run-length code data which are received from the transmitter.

It is to be understood that the term "reproduce" is interpreted to mean not only the recording of the original images on a recording medium such as a paper, but also the indication of the original images on a suitable display device.

In the method of the present invention described above, it is not necessary to use a flag code which precedes and indicates a run-length code for red images, where a line of original images consist of the red images on a white background surface of the subject copy sheet. Namely, the present method simply requires color discrimination code data which precedes or follows a set or sets of run-length code data indicative of the line of original images, so that the color discrimination code data indicates that the line includes the red images in addition to the white images (i.e., background color images). This method permits an improved degree of reduction in the volume of the required image data that should be transmitted for reproduction of the original images, as compared with the methods disclosed in Publications Nos. 60-31388 and 61-123281 of the examined and unexamined Japanese Patent Applications identified above. Further, the instant method is comparable to the method as disclosed in Publication No. 57-119567, in terms of the volumetric reduction of the image data.

In one form of the method of the invention, the color discrimination code data is transmitted to the receiver, before the set or sets of run-length code data. In this case, the receiver can be prepared to process the run-length code data, before it receives the run-length code data, since the color discrimination code data precedes the run-length code data. Namely, the receiver can decode the signals of the run-length code data one after another as it receives the signals. This arrangement results in reducing the required processing time, as compared with an arrangement in which the decoding is initiated only after the entire batch of run-length code data for all the colors of each line of the subject copy sheet has been received.

The first object may also be achieved according to another aspect of the present invention, which provides a method of transmitting a subject copy bearing original images having three colors, from a transmitter to a receiver, the method comprising the steps of: operating the transmitter to scan each line of the subject copy, thereby preparing (a) first signals which distinguish a first combination of two colors of the three colors from the other color, (b) second signals which distinguish a second combination of two colors of the three colors which is different from the first combination, from the other color which cooperates with the second combination to constitute the three colors, and (c) color discrimination code data indicative of at least one of the three colors which appeared in each line of the subject copy; encoding only each of at least one of the first and second signals which is necessary to reproduce each line of the subject copy, into a corresponding set of run-length code data; transmitting the corresponding set of run-length code data, together with the color discrimination code data, from the transmitter to the receiver; and operating the receiver to reproduce each line of the subject copy, based on the color discrimination code data and the corresponding set of run-length code data which are received from the transmitter.

The method described above, which is limited to the transmission of a subject copy having three colors including a background color of the subject copy sheet, provides the same advantage as the method described above.

In one form of the above method of the invention, the three colors consist of white, red and black, and the first signals consist of red image signals whose levels differ between red-image areas of the subject copy in which red images are present, and non-red-image areas of the subject copy in which the red images are absent, while the second signals consist of black image signal whose levels differ between black-image areas of the subject copy in which black images are present, and non-black-image areas of the subject copy in which the black images are absent.

In one arrangement of the above form of the invention, the method further comprises the step of preparing yellow scan signals and red scan signals by scanning each line of the subject copy with yellow and red light beams, respectively. The yellow scan signals has a level of "1" when the scanned spots are red or black and a level of "0" when the scanned spots are white, and the red scan signals has a level of "1" when the scanned spots are black, and a level of "0" when the scanned spots are white or red. The black image signals are prepared such that the level of the black image signals is "1" when the levels of the yellow and red scan signals are both "1", and "0" in the other cases, while the red image signals are prepared such that the level of the red image signals is "1" when the levels of the yellow and red scan signals are "1" and "0", respectively, and "0" in the other cases. In this case, the method may further comprise the step of operating the transmitter to query the receiver, prior to transmitting the color discrimination code data and the corresponding set of run-length code data, to determine whether the receiver is capable of recording red images, the transmitter encoding the yellow scan signals into the corresponding set of run-length code data when the receiver is not capable of recording red images.

In another arrangement of the above form of the invention, the color discrimination code data consists of two bits one of which represents the presence of a red image when the one bit is "1", and the other of which represents a presence of the black image when the other bit is "1".

In another form of the above aspect of the invention, the three colors consist of white, red and black, and the method further comprises the steps of: preparing yellow scan signals and red scan signals by scanning each line of the subject copy with yellow and red light beams, respectively. The yellow scan signals have a level of "1" when the scanned spots are red or black and a level of "0" when the scanned spots are white, while the red scan signals having a level of "1" when the scanned spots are black, and a level of "0" when the scanned spots are white or red; and preparing black-red image signals such that the level of the black-red image signals is "1" when at least one of the levels of the yellow and red scan signals is "1", and "0" in the other cases, and red image signals such that the level of the red image signals is "1" when the levels of the yellow and red scan signals are "1" and "0", respectively, and "0" in the other cases.

The second object indicated above may be accomplished according to another aspect of the present invention, which provides a facsimile apparatus, comprising: a transmitter for transmitting first original images on a first subject copy sheet, to a remote facsimile apparatus, the first original images having at least two colors other than a background color of the first subject copy sheet, the transmitter including (a) means for scanning each line of the first subject copy sheet, thereby preparing a plurality of sets of run-length code data corresponding to the first original images, and color discrimination code data indicative of at least one of the at least two colors which appeared in each line of the first subject copy sheet, the sets of run-length code data being, or being convertible into image signals corresponding to the at least two colors, and (b) means for transmitting together with the color discrimination code data, to the remote facsimile receiver, only each of at least one of the plurality of sets of run-length code data, which at least one set is necessary to reproduce each line of the first subject copy sheet; and a receiver receiving from the remote facsimile apparatus color discrimination code data and run-length code data of second original images on a second subject copy sheet, which are prepared by the remote facsimile apparatus in the same manner as practiced by the claimed facsimile apparatus. The receiver is operable to reproduce each line of the second subject copy sheet, based on the color discrimination code data and run-length code data of the second subject copy sheet.

In one form of the apparatus of the invention, the transmitter comprises a reading device which has three modes of operation consisting of a black and red mode wherein black images and red images are read as distinguished from each other, a black mode wherein the red images as well as the black images are read as the black images, and a red ignore mode wherein the black images are read while the red images are not read.

In another form of the apparatus of the invention, the receiver includes a recording device operable to effect a recording on a recording medium, selectively in different modes depending upon a selected one of a plurality of types of the recording medium, and the facsimile apparatus further comprises: a body having an opening through which the recording medium is installed and removed; a covering member movable between a closed position in which the covering member closes the opening, and an open position in which the opening is open, the body including a portion located near the opening, which portion is covered by the covering member placed in the closed position, and exposed when the covering member is placed in the open position; and an operator-controlled member provided on said portion of the body, for placing the recording device in one of the different modes which corresponds to the selected type of the recording medium.

In the above form of the invention wherein the appropriate operation mode of the recording device is selected by the operator-controlled member provided exclusively for this purpose, the operation to establish the desired mode is easy and simple. Further, the operator-controlled member does not impair the appearance of the apparatus, and is less likely to be confused with the other switches or erroneously operated, since the operator-controlled member is disposed at a location of the recording device which is separate from a location of other operator's control switches or keys and which is normally closed by the covering member. Since the recording medium is changed from one type to another by opening the covering member, an access to the operator-controlled member is automatically obtained when it is desired to change the operation mode to the one that corresponds to the newly set recording medium. Further, the opening of the covering member exposes the operator-controlled member which is normally hidden, the operator's attention is drawn to that operator-controlled member, whereby the operator is less like to forget to operate the operator-controlled member for changing the operation mode of the recording device.

In the above form of the apparatus, the recording device may include a recording head attached to the covering member, and a platen positioned within the body. The recording head is operable to effect the recording on the recording medium supported by the platen while the covering member is placed in the closed position. The covering member and the recording head permit an access to the recording medium while the covering member is placed in the open position.

In another form of the above aspect of the invention, the apparatus further comprises a body having an opening and an operation panel for controlling the apparatus. The operation panel is pivotally supported by the body between a closed position in which the opening is closed and an open position in which the opening is open. In this case, the transmitter of the apparatus may include a sheet presser member, attached to an inside of the operation panel for holding the first subject copy sheet, and a reading head positioned within the body. The sheet presser member is adapted to hold the first subject copy sheet in pressed contact with the reading head while the operation panel is placed in the closed position. The operation panel and the sheet presser member permit an access to the first subject copy sheet while the operation panel is placed in the open position.

In a further form of the apparatus, the apparatus further comprises a body having an opening which is open upwardly and which includes a part through which the recording medium is installed and removed, a covering member which normally closes said part of the opening, and a covering member which covers another part of the opening and which controls the apparatus. The covering member and the operation panel are supported by the body such that each of the covering member and the operation panel is pivotable between a first position in which the opening is closed, and a second position in which the opening is open.

In a still further form of the apparatus, the apparatus further comprises a sheet support on which the first subject copy sheet having an image-bearing surface bearing the first original images is placed such that the image-bearing surface faces the sheet support. The sheet support is provided with a plurality of ribs formed parallel to a direction of feed of the first subject copy sheet.

According to a further aspect of the present invention, there is provided a recording apparatus, comprising: a recording device operable to effect a recording on a recording medium, selectively in different modes depending upon a selected one of a plurality of types of the recording medium; a body having an opening through which the recording medium is installed and removed; a covering member movable between a closed position in which the covering member closes the opening and an open position in which the opening is open, the body including a portion located near the opening, which portion is covered by the covering member placed in the closed position and exposed when the covering member is placed in the open position; and an operator-controlled member provided on said portion of the body, for placing the recording device in one of the different modes which corresponds to the selected type of the recording medium.

BRIEF DESCRIPTION OF THE DRAWINGS

The above and optional objects, features and advantages of the present invention will be better understood by reading the following detailed description of the presently preferred embodiments of the invention, when considered in connection with the accompanying drawings, in which:

FIG. 10 is a schematic view illustrating the principle of reciprocation of the reading head;

FIG. 11 is a fragmentary side elevational view in cross section, showing a part of the recording device of the facsimile apparatus;

FIG. 12 is a rear bottom plan view of a recording head of the apparatus;

FIG. 13 is a view showing the selector switch;

FIG. 14 is a block diagram schematically showing the transmitter section of the facsimile apparatus of FIG. 1 connected to the receiver section of a remote facsimile apparatus;

FIGS. 15(1) through 15(3) are explanatory views illustrating a signal processing operation in the transmitter section of the apparatus of FIG. 1, when a line of image including three different colors is transmitted;

FIGS. 17(1) through 17(3) and FIGS. 18(1) through 18(3) are explanatory views showing signal processing operations in the transmitter section of the apparatus of FIG. 1, when a line of image including only two colors, white and black, or white and red, is transmitted; and FIGS. 19(1) through 19(3) are views corresponding to those of FIGS. 15(1) through 15(3), showing a modified embodiment of the invention.

DETAILED DESCRIPTION OF THE PREFERRED EMBODIMENTS

Figure 1:
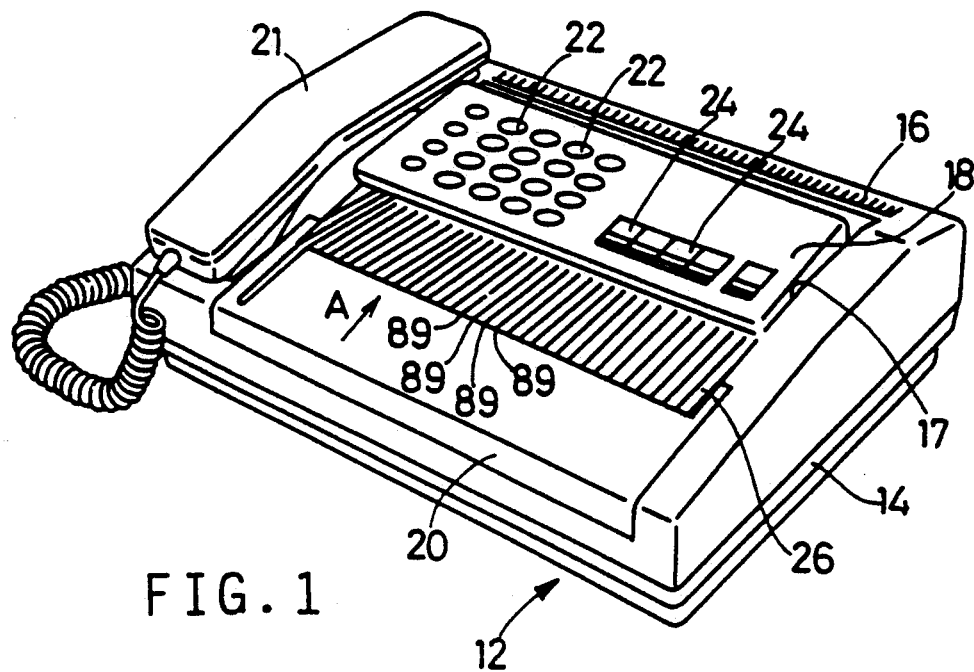
FIG. 1 is a perspective view of one embodiment of the invention in the form of a facsimile apparatus.

Referring first to FIG. 1, a facsimile apparatus 12 has a box-like lower casing 14 with an upper opening and an upper casing 16 which covers the opening of the lower casing 14. The upper casing 16 has an opening 17 whose rear portion is closed by an operator's control panel 18 and whose front portion is closed by a top cover 20. On a portion of the upper surface of the upper casing 16, which is adjacent to one end of the opening 17, there is disposed a telephone receiver 21. Both the control panel 18 and the top cover 20 are supported pivotally about respective parallel axes, such that the control panel 18 and the top cover 20 are pivotable independently of and without interfering with each other. The control panel 18 is inclined downward as it extends toward the top cover 20. The upper surface of the control panel 18 has an array of numeral pushbuttons 22 in its left portion, and an array of transmission/reception control pushbuttons 24 in its right portion. The pushbuttons 22 are used for telecommunication connection with a remote facsimile receiver, and the pushbuttons 24 are used for controlling the facsimile transmitter and receiver of the instant apparatus 12, which will be described. Since the pushbuttons 22, 24 are functionally grouped in the left and right portions of the control panel 18, the apparatus can be operated in an efficient manner for setting the facsimile transmitter and receiver and for dialing to a desired remote facsimile receiver. Since each pushbutton 22, 24 is assigned to perform only one function, the control panel 18 can be easily manipulated with a minimum chance of operating error. Further, the inclination of the control panel 18 enables the pushbuttons 22, 24 to be easily observed by the operator and facilitates the operation.

Figure 2:
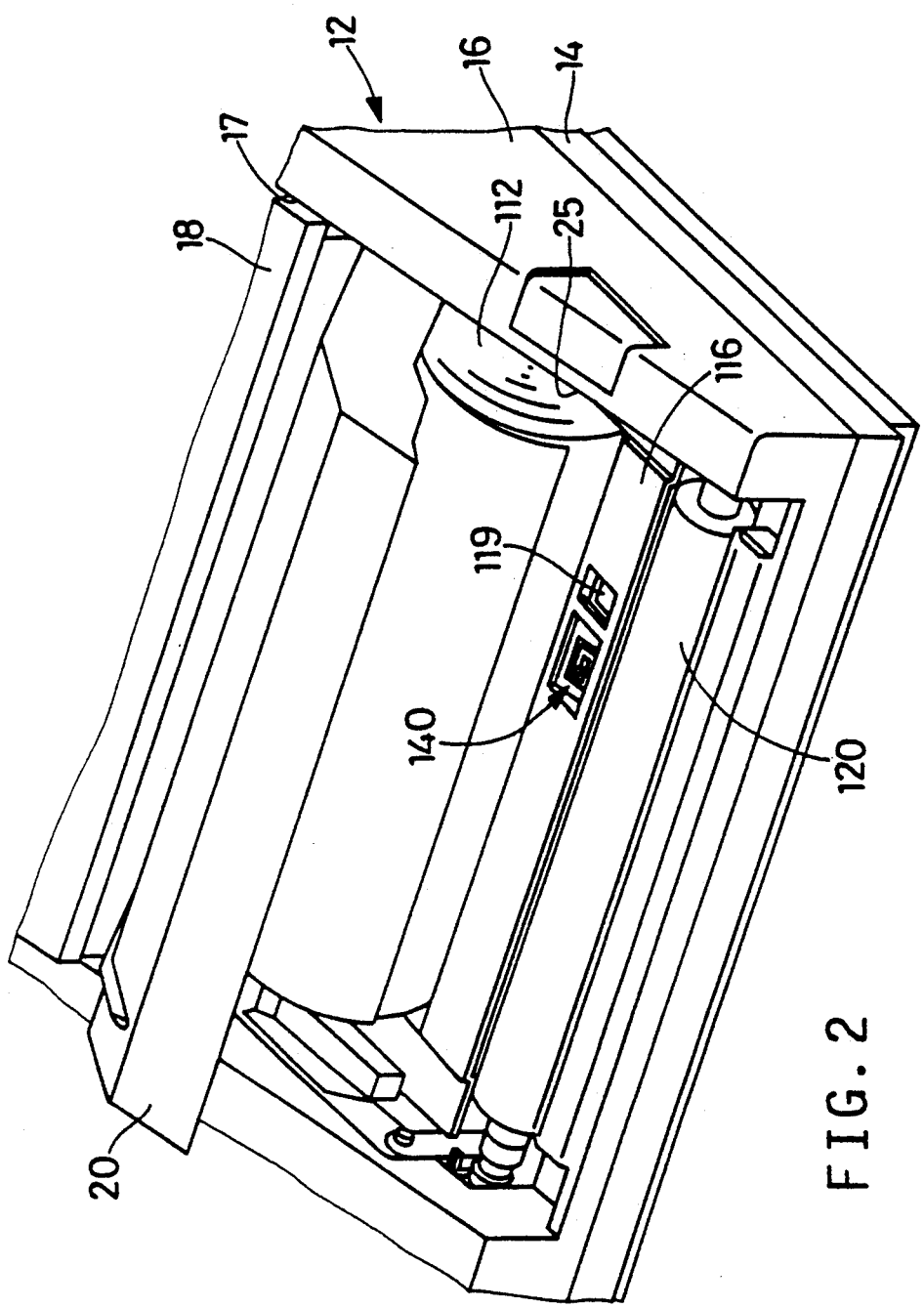
FIG. 2 is a fragmentary perspective view showing a portion of the facsimile apparatus at which a selector switch is provided and a position of a top cover of the apparatus in which the selector switch is operated.
Figure 3:
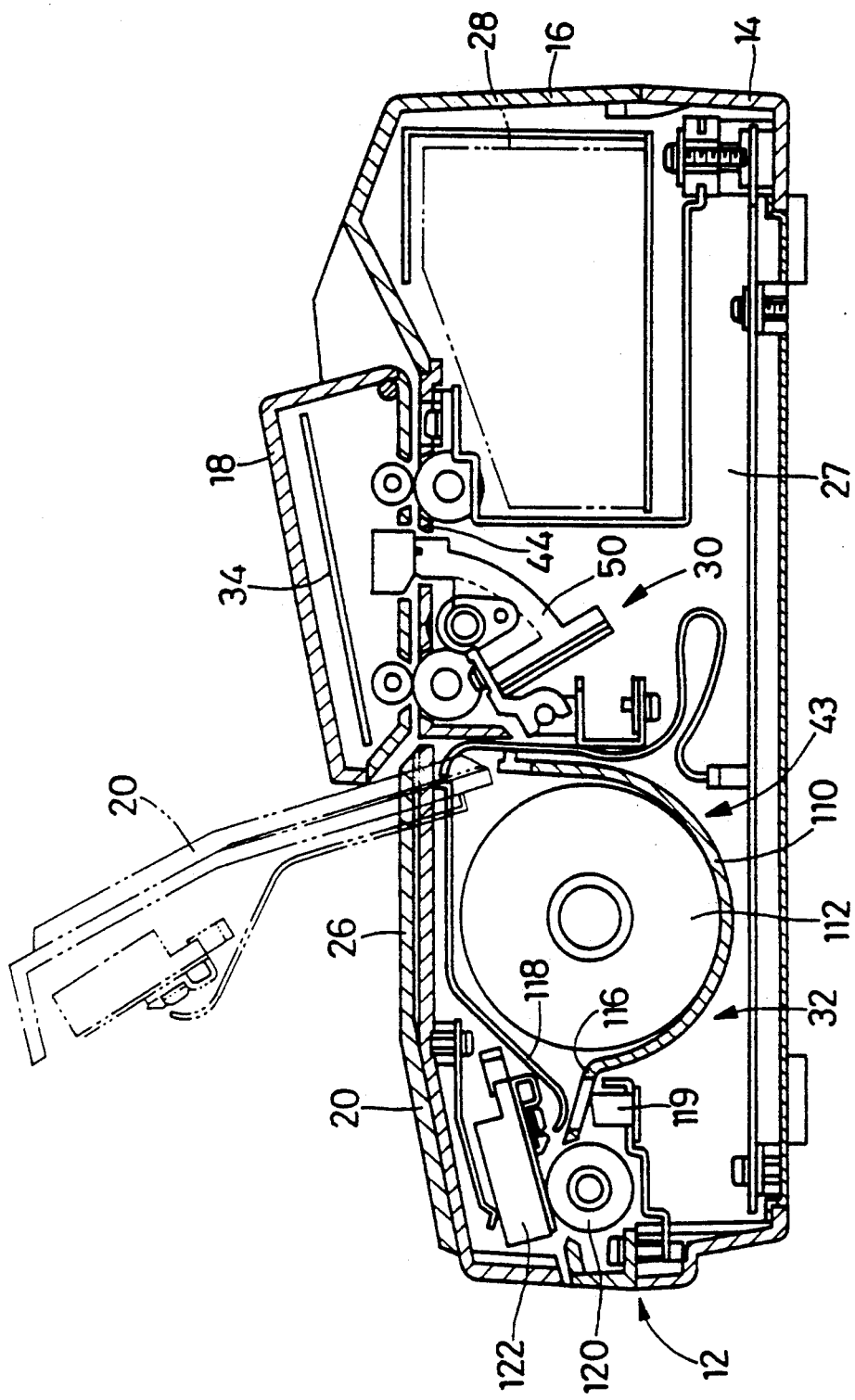
FIG. 3 is a side elevational view in cross section of the facsimile apparatus.

As is apparent from FIG. 2, the top cover 20 closes a cavity 25 in which a roll of a recording medium in the form of a thermo-sensitive web 112 is accommodated. The front end portion of the top cover 20 is downwardly inclined, and the rear portion on the side of the control panel 18 is used as a sheet support 26 (FIGS. 19 red 5) on which subject copy sheets 36 (FIG. 4) are placed. The sheet support 26 extends parallel to the bottom wall of the lower casing 14. As shown in FIG. 3, the apparatus 12 has an interior chamber 27 in which are provided a power source 28, a reading device 30 and a recording device 32. The power source 28 is disposed under the top wall of the upper casing 16. The reading device 30 is disposed under the control panel 18, while the recording device 32 is disposed below the top cover 20. The reading and recording devices 30, 32, which serve as parts of facsimile transmitter and receiver, respectively, will be described.

Figure 4:
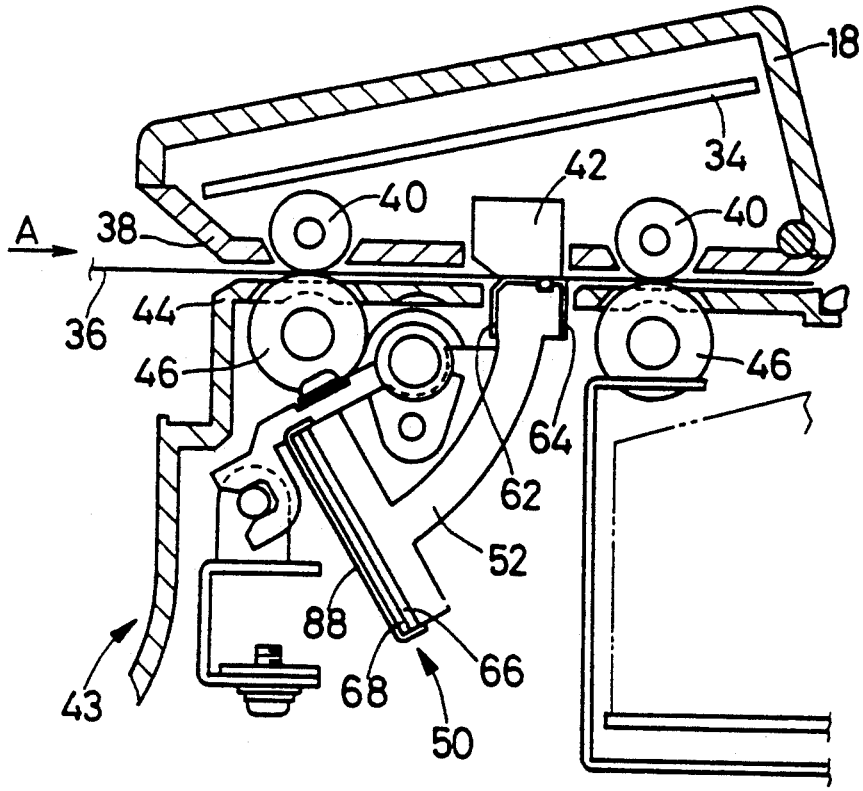
FIG. 4 is a fragmentary elevational view partly in cross section, showing a reading device and adjacent parts of facsimile apparatus.

Referring to FIG. 4, the control panel 18 is provided with an inner printed-circuit board 34 which carries fixed contacts of a plurality of switches which are opened and closed by the pushbuttons 22, 24. Further, the control panel 18 is formed with a lower guide plate 38 for guiding the subject copy sheets 36 which bear original images to be transmitted. The subject copy sheets 36 are placed in a stack on the sheet support 26 such that the surfaces of the sheets 36 bearing the original images face downward. The sheets 36 are fed one after another along a feed path parallel to the guide plate 38, in a direction from the front to the rear of the apparatus 12. Two small-diameter idler rolls 40 are rotatably disposed in spaced-apart relation with each other along the feed path of the subject copy sheet 36. Between these two idler rolls 40, there is disposed a sheet presser member 42. Within the cavity 27, there is provided a frame 43 which includes a guide portion 44 which cooperates with the guide plate 38 to define the feed path of the subject copy sheet 36. Two large-diameter drive rolls 46 are rotatably disposed such that the rolls 46 are exposed from the guide portion 44, at spaced-apart positions corresponding to the idler rolls 40. While the control panel 18 is in its closed position, the small-diameter idler rolls 40 are held in pressed contact with the large-diameter drive rolls 46. With the drive rolls 46 driven by a suitable drive motor (not shown) together with the idler rolls 40, the sheet 36 is fed along the feed path. Opposite to the operating surface of the sheet presser member 42, there is disposed a reading portion of a reading head 50 of the reading device 30.

Figure 5:
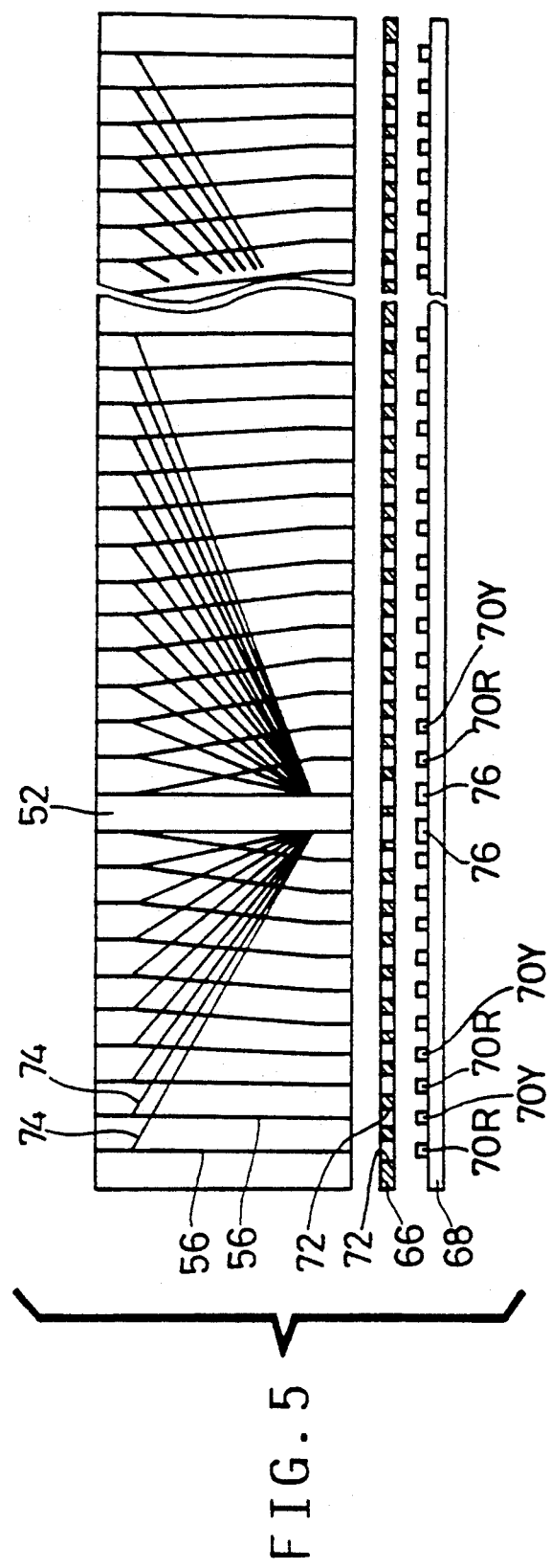
FIG. 5 is a schematic exploded view of a reading head of the reading device of the facsimile apparatus.
Figure 6:
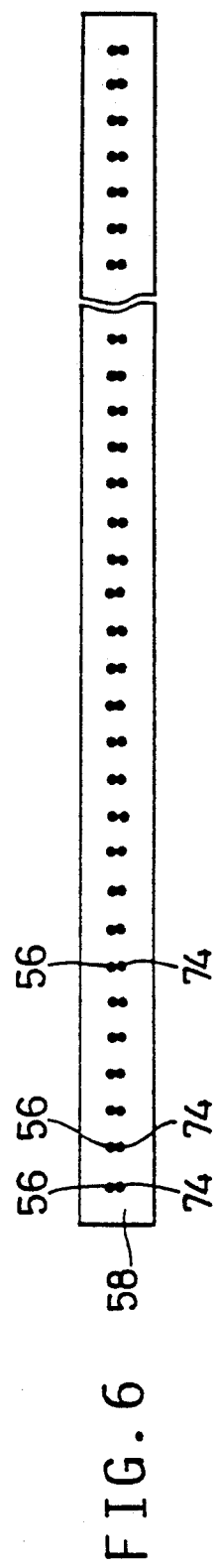
FIG. 6 is a plan view of the reading surface of the reading head.

The reading head 50 is of an optical type utilizing optical fibers, capable of reading black and red images on an image-bearing surface of the subject copy sheet 36 which has a white or whitish background color. The reading head 50 is a generally elongate member which extends across the width of the copy sheet 36, i.e., extends perpendicularly to the feeding direction of the copy sheet 36, over a length larger than the width of the sheet 36. The head 50 has a body 52, on which 104 light-emitting optical fibers 56 are disposed in spaced-apart relation with each other in the longitudinal direction of the body 52, such that the fibers 56 extend parallel to each other in the direction perpendicular to the length of the body 52, as schematically illustrated in FIG. 5. While the light-emitting optical fibers 56 are covered by a suitable cover (not shown), the reading end of each optical fiber 56 is exposed on an end face or reading surface 58 of the head body 52 opposite to the working surface of the sheet presser member 42. The exposed ends of the fibers 56 are equally spaced apart from each other (by a distance of 2 mm in this embodiment), along a straight line parallel to the length of the head body 52, as indicated in FIG. 6. The reading surface 58 is kept a suitable small distance away from the working surface of the sheet presser member 42, by spacers 62, 64 attached to front and rear faces (as viewed in the sheet feeding direction) of the upper end portion of the head body 52, as shown in FIG. 4.

Opposite to the proximal ends of the light-emitting optical fibers 56 remote from the exposed ends indicated above, there are provided respective light-emitting elements in the form of photodiodes fixed on a printed-circuit board 68 which is secured to the head body 52 via a lamp house 66. In the present embodiment, the light-emitting elements consist of red-light emitting elements 70R adapted to emit red beams, and yellow-light emitting elements 70Y adapted to emit yellow beams. These red-light and yellow-light emitting elements 70R and 70Y are arranged alternately such that each yellow-light emitting element 70Y is disposed between the two adjacent red-light emitting elements 70R. Each light emitting element 70R, 70Y is accommodated in a corresponding hole 72 formed through the lamp house 66, so that the elements 70R, 70Y are optically shielded from each other by the lamp house 66. The images on the subject copy sheet 36 are read by irradiating the image-bearing surface of the sheet 36 with the red and yellow beams emitted by the light emitting elements 70R, 70Y.

Figure 7:
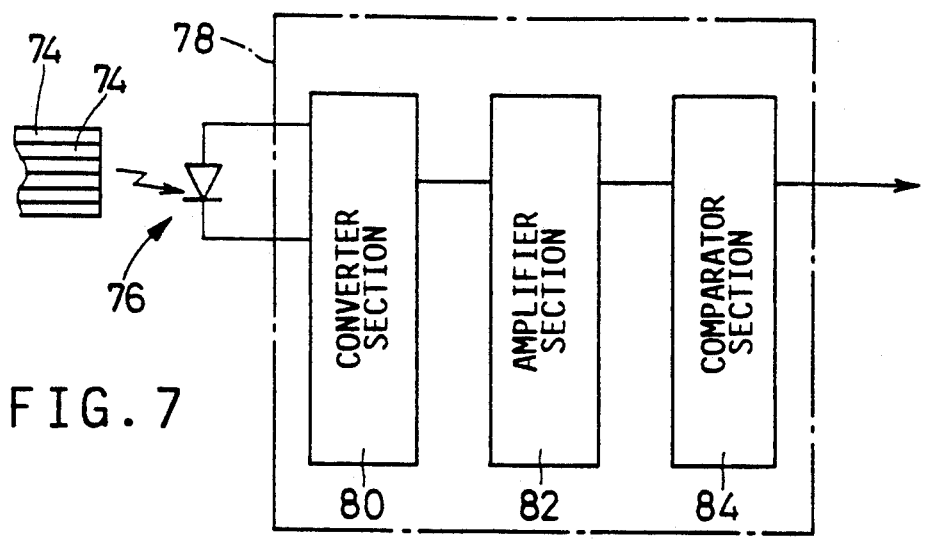
FIG. 7 is a block diagram illustrating the light-sensitive and signal processing portion of the reading head.

The head body 52 further has light-receiving optical fibers 74 corresponding to the light-emitting optical fibers 56. The distal ends of the light-receiving optical fibers 74 are also exposed on the reading surface 8 of the head body 52, such that the exposed ends of the corresponding optical fibers 56, 74 are located adjacent to each other, as indicated in FIG. 6. The light-receiving optical fibers 74 are divided into eight groups each consisting of 10 or 14 fibers. The proximal ends of each group of optical fibers 74 are positioned opposite to one of eight light-sensitive elements 76, which are silicon photodiodes fixed on the printed-circuit board 68. The red and yellow light beams emitted by the light emitting elements 70R, 70Y are radiated from the exposed ends of the light-emitting optical fibers 56, toward the respective reading spots on the subject copy sheet 36, and the reflected beams from the copy sheet 36 are transmitted through the light-receiving optical fibers 74 to the appropriate light-sensitive elements 76. As indicated in FIG. 7, each light-sensitive element 76 is connected to a photo-electric converter 78. More specifically, the light-sensitive element 76 is connected to a converter section 80, which converts an output current of the element 76 into a voltage signal. The voltage output of the converter section 80 is applied to an amplifier section 82 by which the input voltage is amplified. The output of the amplifier section 82 is compared by a comparator section 84, with a predetermined reference voltage, so that the comparator section 84 provides a high or low binary output, depending upon the level of the input voltage as compared with the reference voltage. The binary outputs of the individual light-sensitive elements 76, which are image data indicative of the images on the copy sheet 36, are stored in a suitable read data memory provided in a RAM of the computer. The computer is also adapted to control the timing at which the light emitting elements 70R, 70Y are energized. The computer and the reading head 50 constitute the reading device 30.

Figure 8:
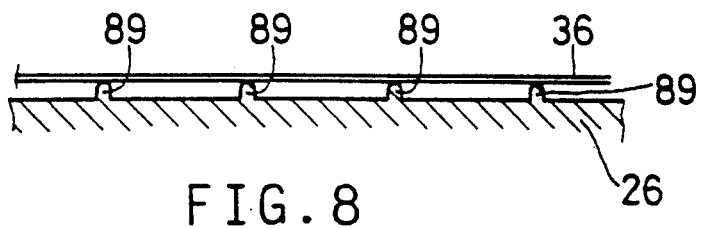
FIG. 8 is a front elevational view in cross section of a part of a sheet support of the facsimile apparatus.

The outer surface of the printed-circuit board 68 is covered by a shield member 88 to protect the board 68 from noises, as shown in FIG. 4. As illustrated in FIGS. 1 and 8, the sheet support 26 provided by the top cover 20 has a multipliticy of parallel ribs 89, in the form of protrusions, which have a height of 1 mm and extend in the sheet feeding direction, indicated by arrow A in FIGS. 1 and 4. These ribs 89 prevent the subject copy sheet 36 from carrying therewith any dirt or dust on the sheet support 26, into the reading device 30 when the sheet 36 is fed. Consequently, the reading surface 58 is protected from such dirt or dust, which undesirably lowers the reading accuracy of the reading head 50.

Figure 9:
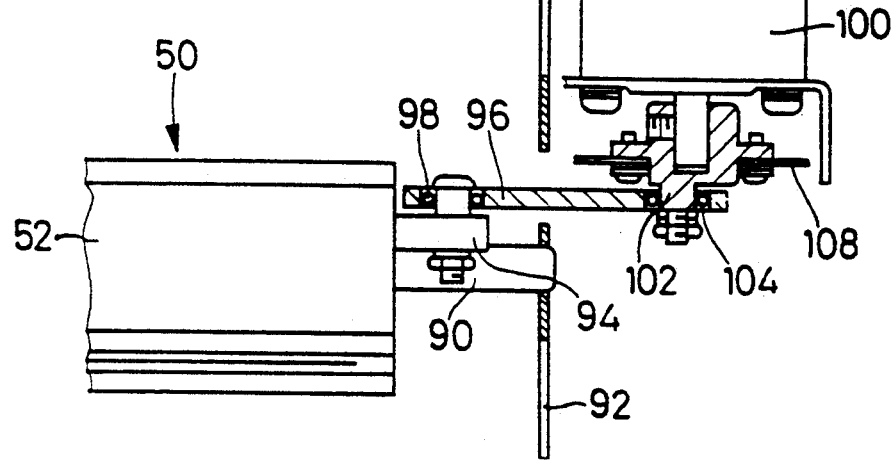
FIG. 9 is a plan view partly in cross section of a mechanism for reciprocating the reading head.

The body 52 of the reading head 50 has two arms 90 which extend from its opposite longitudinal ends in the longitudinal direction, as indicated in FIG. 9 (which shows only one arm 90). The head body 52 is longitudinally movably supported at its arms 90, by side walls 92 secured to the lower casing 14. An extension 94 is provided so as to extend from one of the opposite ends of the head body 52. To the free end of the extension 94, there is connected one end of a connecting rod 96 via a bearing 98, such that the connecting rod 96 is pivotable about the axis of the bearing 98. The other end of the connecting rod 96 is connected via a bearing 104 to a crankshaft 102 which is rotated by a drive motor 100. With the crankshaft 102 rotated, the connecting rod 96 is reciprocated, whereby the reading head 50 is reciprocatingly moved in its longitudinal direction parallel to the width of the copy sheet 36.

The reading device 30 is provided with a rotary encoder, which includes a thin disk 108 attached to the output shaft of the drive motor 100. The disk 108 has a plurality of radial slits which are spaced from each other in the circumferential direction. The rotary encoder further includes a light emitter and a light receiver which are disposed on both sides of the encoder disk 108. When the encoder disk 108 is rotated with the drive motor 100, a light beam emitted by the light emitter is received by the light receiver through the slits, and the light emitting elements 70R, 70Y are energized in response to an output signal of the light receiver of the rotary encoder. It is noted that the slits are not equally spaced from each other in the circumferential direction of the disk 108.

The reading head 50 is moved in the right direction (forward direction) while the drive motor 100 is rotated through 180° C. in the counterclockwise direction (as viewed in FIG. 10) from the position at which the distance between the axis of the motor 100 and the axis of the bearing 98 is maximum. With a further 180° rotation of the motor 100, the reading head 50 is moved in the backward direction to the original position. Therefore, an operation of the drive motor 100 at a constant speed causes a reciprocating motion of the reading head 50 which is represented by a sine curve indicative of a relationship between the movement distance and time.

For the reading head 50 to read predetermined spots which are equally spaced apart from each other, the timing of energization of the light emitting elements 70R, 70Y should be determined so that the energization occurs each time the reading head 50 has moved a predetermined incremental distance (e.g., 0.125 mm) equal to the pitch or spacing of the reading spots. The circumferential positions of the slits on the encoder disk 108 are determined to satisfy the above requirement.

The instant reading head 50 has three different modes of operation: a BLACK mode in which red spots are also read as black spots; a RED IGNORE mode in which the red spots are not read, or read as non-imaged or background-color spots; and a BLACK AND RED mode in which both black and red spots are read as distinguished from each other. In the BLACK mode, only the yellow light emitting elements 70Y are energized. More specifically described, the detection of one slit on the encoder disk 108 causes the first one (as viewed in the moving direction of the head 50) of the elements 70Y of each of the eight groups to be energized, whereby the reading spots irradiated by the light beams from the light-emitting optical fibers 56 corresponding to the energized yellow light emitting elements 70Y are initially read. A short time after the reading of these first group of reading spots, the second light emitting elements 70Y of each group are energized to read the second group of reading spots. In this manner, the predetermined reading spots which are spaced apart from each other by a distance of 4 mm are read by the yellow light beams emitted by the yellow light emitting elements 70Y of each group. The next slit on the encoder disk 108 is detected when the reading head 50 has been moved an incremental distance of 0.125 mm (corresponding to the size of the picture element or dot). In response to this detection, the first light emitting element 70Y of each group is again energized. Subsequently, the second and following elements 70Y of each group are energized. Thus, the reading spots which are spaced apart from each other by a distance of 0.125 mm are read over a distance of 4 mm by the yellow light beams emitted by each yellow light emitting element 70Y of each group, whereby a line of images is read by one forward movement of the reading head 50.

After the first line of images is read, the subject copy sheet 36 is fed by a predetermined amount equal to a predetermined line spacing, with the large-diameter drive rolls 46 rotated by the drive motor (not shown). Then, the reading head 50 is moved in the backward direction. During this movement, the yellow light emitting elements 70Y of the eight groups are sequentially energized, whereby the second line of images is read. In this connection, it is noted that the distance of movement of the reading head 50 is 4.206 mm, which is larger than the distance of 4 mm between the adjacent light emitting elements 70Y, so that the reading head 50 is moved a further distance after the head 50 has reached the end of its 4 mm travel. During this further movement of the reading head 50 and the following backward movement to the above-indicated end, the copy sheet 36 is fed to the next line. To obtain the overall travel distance of 4.206 mm, the amount of offset of the crankshaft 102 is set to 2.103 mm. This arrangement eliminates an otherwise required interruption of the drive motor 100 upon feeding of the copy sheet 36.

In the BLACK mode wherein both black and red colored spots are read as black spots, the red spots as well as the black spots are read as black spots by irradiation with the yellow beams. Therefore, only the yellow light emitting elements 70Y are energized in the BLACK mode.

In the RED IGNORE mode in which the red spots are ignored or not read as imaged spots, only the red light emitting elements 70R are energized. Since the red spots reflect red beams to almost the same extent as the white spots (i.e., background color of the copy sheet 36), the red spots are read as the background color or blank area of the sheet 36. Therefore, only the black spots are read as black images.

When the reading head 50 is operated in the BLACK AND RED mode, both the yellow light emitting elements 70Y and the red light emitting elements 70R are energized. In this case, the elements 70Y are energized to read a line of images while the reading head 50 is moved in the forward direction. Then, the same line is read with the elements 70R energized while the reading head 50 is moved in the backward direction. Thus, the same line is read two times without a feeding movement of the copy sheet 36.

The recording device 32 will now then be described. In a portion of the chamber 27 of the apparatus 2 which is covered by the top cover 20, there is disposed a semi-cylindrical portion of the frame 43, which portion serves as a roll holder 110 for rotatably supporting a roll of the thermo-sensitive web 112, as illustrated in FIG. 3. The leading portion of the web 112 is passed toward the free end of the top cover 20, extending between a guide portion 116 formed at the front end of the roll holder 110, and a web guide 118 attached to the inner surface of the top cover 20. Below the guide portion 116 of the roll holder 110, there is provided an end-mark sensor 119, which is aligned with a hole formed through the guide portion 116, as shown in FIG. 11. The trailing end portion of the web 112 has a black mark on its back surface. When the black mark is detected by the end-mark sensor 119 through the hole in the guide portion 116, the sensor 119 provides the computer with an output signal indicative of the trailing end of the web 112.

In front of the roll holder 110, there are disposed a platen 120 and a recording head 122. The platen 120 is rotatably supported via a shaft 124 by the lower casing 14. The platen 120 is rotated by a web feed motor (not shown). The recording head 122, which is mounted on the top cover 20, is of a thermal line printer type in which a line of images is thermally recorded at one time. The roll of the web 112 is set in position in the roll holder 110 while the top cover 20 is in its open position as indicated in two-dot chain line in FIG. 3. The top cover 20 is closed with the leading portion of the web 112 extending past the platen 120. In this condition, the recording head 122 is held in close contact with the surface of the web 112 for recording on the web surface. The recorded length of the web 112 is moved out of the apparatus 12, through a clearance between the front end of the top cover 20 and the upper end of the lower casing 14. As indicated in FIG. 11, the front end of the top cover 20 has a sharp lower edge which serves as a cutter 125 for cutting the recorded portion of the web 112. Namely, the leading portion of the web 112 which has been ejected from the apparatus 12 is gripped by the operator, and pulled upward so that the leading portion is cut off by the cutter 125. Since the cutting edge of the cutter 125 lies on the outer surface of the top cover 20, a swarf produced upon cutting of the web 112 falls outside the housing of the apparatus 12, and does not contaminate the apparatus.

The recording head 122 has an elongate base plate 126 extending along the platen 120. The base plate 126 has a multiplicity of heat-generating elements which are arranged in spaced-apart relation with each other at a pitch of 0.125 mm, in the longitudinal direction of the platen 120. The base plate 126 is backed by a heat radiator plate 128 for radiating heat upon recording operation of the recording head 122. For driving the recording head 122, a flexible cable 130 is connected to the base plate 126. The flexible cable 130 is protected by a cover 132.

The recording head 122 has a connector 134 for connection to a power source, and another connector 136 for connection to a control circuit which principally consists of a computer. The heat-generating elements of the recording head 122 are selectively energized in response to drive signals from the computer, for recording on the thermo-sensitive web 112. The recording head 122 and the control circuit constitute the recording device 32 of the facsimile receiver.

In the instant facsimile apparatus, the recording device 32 is operated either in a BLACK mode in which the recording is effected in black color only, or in a BLACK AND RED mode in which the recording is effected in black and red colors. The thermo-sensitive web 112 is changed from one type suitable for the BLACK mode to another type suitable for the BLACK AND RED mode, or vice versa, when the operation mode of the recording device 32 is changed. Accordingly, the computer of the recording device 32 is operated in the corresponding two different modes.

The thermo-sensitive web 112 used in the BLACK mode has a black-coloring layer formed on a substrate, so that heated portions or spots of the black-coloring layer are blackened. On the other hand, the thermo-sensitive web 112 used in the BLACK AND RED mode has a red-coloring layer formed on a substrate, an erasing layer on the red-coloring layer, and a black-coloring layer on the erasing layer. The red-coloring and black-coloring layers, when heated, produce red and black colors, respectively. The erasing layer between the red- and black-coloring layers, when heated, reacts with a chromogenic material of the black-coloring layer, so as to erase the blackened portions of the black-coloring layer. The coloring temperature of the black-coloring layer is lower than the reaction temperature of the erasing layer, and the coloring temperature of the red-coloring layer is the highest. Therefore, in the BLACK mode, the heat-generating elements of the reading head 122 corresponding to the black spots to be produced are energized with an amount of energy necessary to color the black-coloring layer. In the BLACK AND RED mode, the heat-generating elements corresponding to the black and red spots are energized with an amount of energy necessary to color the black-coloring layer, and then the heat-generating elements corresponding to only the red spots are energized with an amount of energy necessary to color the red-coloring layer. Thus, the manner in which the heat-generating elements are energized by the computer differs between the BLACK mode, and the BLACK AND RED mode, depending upon the type of the thermo-sensitive web 112.

The mode of operation of the computer is changed from BLACK to BLACK AND RED or vice versa, by a mode selector switch 140 provided on a portion of the roll holder 110, adjacent to the end-mark sensor 119, as shown in FIG. 2. The selector switch 140 is normally covered by the top cover 20. As indicated in FIG. 13, the selector switch 140 is a two-position switch having a knot 142 which is linearly movable between two positions indicated at NORMAL and RED-BLACK on a portion of the lower casing 14, adjacent to the switch. The NORMAL position is selected to establish the BLACK mode, while the RED-BLACK position is selected to establish the BLACK AND RED mode. When the operator installs a new roll of the thermo-sensitive web 112 with the top cover 20 in the open position, the operator can easily observe the indicia "NORMAL" and "RED-BLACK", and may set the selector switch 140 to the appropriate position corresponding to the type of the web 112 currently placed in position. The computer is placed in the appropriate position by a signal generated by the selector switch 140. The type of the web 112 (operation modes of the recording device 32) may be indicated by suitable symbols or other indicia, rather than the letters used in the present embodiment.

As described above, the reading device 30 serves as a part of the facsimile transmitter for translating the images on the subject copy sheet 36 into facsimile signals suitable for delivery to a remote facsimile receiver over a communication system, while the recording device 32 serves as a part of the facsimile receiver for translating the facsimile signals from a remote facsimile transmitter into a facsimile record on the thermo-sensitive web 112.

Referring to FIG. 14, the facsimile transmitter of the instant facsimile apparatus 12 is indicated at 144. The facsimile transmitter 144 includes the photo-electric converter 78 shown in FIG. 7, and is connectable to a remote facsimile receiver 146 by a communication channel 148. The remote facsimile receiver 146 includes a recording device 32a similar to the recording device 32 of the apparatus 12.

While FIG. 14 shows only the facsimile transmitter 144 of the apparatus 12 of FIGS. 1-13 as connected to the receiver 146 of the remote facsimile apparatus, to transmit the facsimile signals to the remote facsimile transmitter 146, it will be understood that the facsimile receiver including the recording device 32 of the apparatus 12 is connectable to a remote facsimile transmitter.

The facsimile transmitter 144 which includes the photo-electric converter 78 further includes a signal converter 150 and an encoder 152. The photo-electric converter 78 converts original images 154 on the copy sheet 36 into electric image signals, according to the binary output signals of the light-sensitive elements 76 of the reading head 50 of the reading device 30, which signals are produced as a result of scanning of each line of images on the copy sheet 36 with the yellow and red beams, as described above, when the facsimile transmitter is placed in the BLACK AND RED mode. The signal converter 150 is adapted to produce black image signals, red image signals and a color discrimination code data, as described below, according to the image signals from the photo-electric converter 78. The encoder 152 is adapted to encode the black and red image signals into respective groups of run-length code data.

The remote facsimile receiver 146 includes a decoder 156, and the recording device 32a which is similar to the recording device 32, as indicated above. The decoder 156 decodes the run-length code data received through the communication channel 148, into the black image signals and red image signals. According to these black and red image signals, the recording device 32a is operated to produce copied images 158 on a thermo-sensitive recording medium similar to the web 112 used in the apparatus 12 of FIGS. 1-13.

There will be described in detail the manner in which the coded facsimile signals indicative of black and red images on the white subject copy sheet 36 are transmitted from the facsimile transmitter 144 to the remote facsimile receiver 146.

FIG. 15(1) schematically shows a line of the original images 154 which consist of black and red images on a white base or background of the subject copy sheet 36. It is noted that blank portions of the white background may be considered to be white images. Described precisely, these white, black and red images indicated as "WHITE", "BLACK" and "RED" in FIG. 15(1) consist of white, black and red picture elements or dots, respectively. Namely, the "WHITE", "BLACK" and "RED" indicate white, black and red areas which consist of white, black and red dots on a line.

Initially, the above line of original images 154 is scanned by or irradiated with yellow beams emitted by the yellow light emitting elements 70Y, as described above. As a result, yellow beam scan signals "a" as indicated in FIG. 15(2) are obtained. In FIG. 15(2), "1" indicates the presence of the black or red images, while "0" indicates the absence of these images. While the white background of the copy sheet 36 reflects the yellow beams, the red areas or spots absorb the yellow beams to substantially the same extent as the black areas or spots. Hence, the red areas are also read as black areas by the yellow beam scanning of the line. Subsequently, the same line of images is scanned by red beams emitted by the red light emitting elements 70R. As a result, red beam scan signals "b" as indicated in FIG. 15(2) are obtained. While the red areas reflect the red beams to substantially the same extent as the white areas, the black areas absorb the red beams. Therefore, only the black areas are read as imaged portions, and the red areas are read as the white background or non-imaged portions.

The yellow scan signals "a" and the red scan signals "b" provided by the photo-electric converter 78 are converted by the signal converter 150 into black image signals "c", red image signals "d" and a color discrimination code data "e", as illustrated in FIG. 15(3). The black image signals "c" take the level of "1" only when the level of the yellow scan signal "a" and the level of the red scan signal "b" are both "1". In the other cases, the level of the black image signals "c" are "0". The red image signals "d" take the level of "1" only when the level of the yellow scan signal "a" is "1" while the level of the red scan signal "b" is "0". In the other cases, the level of the red image signals "d" is "0". The color discrimination code data "e" is a two-bit code indicative of the presence and absence of the black and red colors in the scanned line of original images 154, as indicated below.

11: Both red and black images are present.
10: Red image is present, but no black image is present.
01: Black image is present, but no red image is present.
00: Neither red image nor black image is present.

Usually, a line of images includes the background color, i.e., white image. Even if the background color is not included in the line, the above color discrimination code data "e" may serve the intended purpose. The signal converter 150 incorporates a computer adapted to process the yellow and red scan signals "a" and "b" to prepare the black and red image signals "c" "d" and the color discrimination code data "e".

The thus prepared black and red image signals "c" and "d" are coded by the encoder 152, into appropriate sets of run-length code data. For this purpose, the MH (Modified Huffman) Code widely used for the black and white image codification is utilized. The prepared sets of run-length code data for the line of original images 154 are transmitted from the encoder 152 of the facsimile transmitter 144 to the remote facsimile receiver 146, over the communication channel 148, following a line synchronization code. While the set of run-length code data corresponding to the black image signals "c" and the set of run-length code data corresponding to the red image signals "d" are transmitted in series, these transmission occur following the transmission of the color discrimination code data "e". If neither the black images nor the red images are present in the line of images, only the color discrimination code "e" ("00" in this case) is transmitted to the remote facsimile receiver 146.

Figure 16:
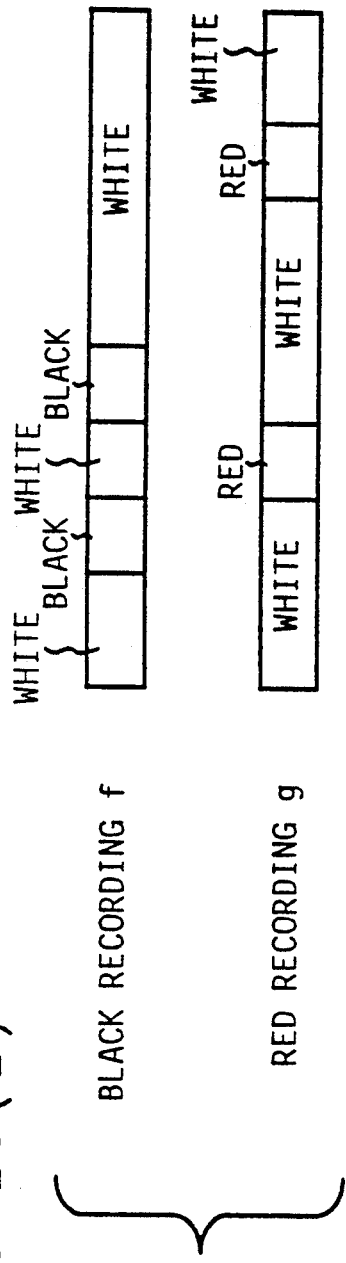
FIGS. 16(1) through 16(2) are explanatory views illustrating a signal processing operation the receiver section of the remote facsimile apparatus.

The decoder 156 of the remote facsimile receiver 146 decodes the received sets of run-length code data, back into the black image signals "c" and the red image signals "d" as indicated in FIG. 15(3). Based on these image signals "c" and "d", the recording device 32a effects a recording operation on a thermo-sensitive recording medium capable of recording in black and red colors on its white recording surface. More specifically, a black recording operation "f" is first effected along a line, according to the black image signals "c", and then a red recording operation "g" is effected along the line, according to the red image signals "d", as indicated in FIG. 16(1). As a result, a line of copied images 158 is obtained in black and red colors on the white background of the recording medium, as indicated in FIG. 16(2). The recorded line of images 158 is similar to the line of original images 154 on the subject copy sheet 36.

While the image transmission and recording operations illustrated in FIGS. 15 and 16 described above relate to the line of original images 154 which includes both black and red images, a line of original images may consist solely of black images on the white background, as indicated in FIG. 17(1). In this case, the facsimile transmitter 144 operates in the following manner. Namely, the yellow scan signals "a" and the red scan signals "b" produced by the photo-electric converter 78 are completely the same, as indicated in FIG. 17(2). Based on these signals "a" and "b", the signal converter 150 produces the black image signals "c" and the red image signals "d", as indicated in FIG. 17(3). Further, the signal converter 150 produces the color discrimination code data "e" ("01"), based on the image signals "c", "d". In this case, only the black image signals "c" are encoded by the encoder 152, into the corresponding set of run-length code data, which is transmitted to the facsimile receiver 146 over the channel 148, following the color discrimination code data "e".

As indicated in FIG. 17(e), the values of the red image signals "d" for the entire line of original images 154 are "0". In this instance, the coding of the red image signals "d" is omitted, whereby the volume of the data to be transmitted from the transmitter 144 is accordingly reduced. It is significant to note that the remote facsimile receiver 146 receives the color discrimination code "01" before it receives the run-length code data for the line of original images 154, and therefore can recognize that the original image line does not include red images, whereby the receiver 146 can be prepared to effect the decoding and recording associated with only the black image signals "c", without the corresponding operations associated with the red image signals "d".

Where the line of original images 154 includes only red images on the white background, only the red image signals "d" are coded into the corresponding set of run-length code data, which is transmitted following the color discrimination code data "e", as indicated in FIGS. 18(1) through 18(3). If the line consists solely of the background color of white, only the color discrimination code "00" is transmitted from the transmitter 144 to the receiver 146, and no run-length code data is transmitted, as described above.

The above-described operations applies where the remote receiver 146 is compatible with the transmitter 144, as described above. However, if the remote receiver is adapted to record only black images on a white recording medium, this fact is confirmed prior to the transmission of the run-length code data. In this case, the yellow scan signals "a" are coded into the corresponding run-length code data indicated in FIGS. 15(2), 17(2) and 18(2), which is transmitted to the receiver 146. However, the red images are recorded as black images. In this case, the color discrimination signal "e" is not transmitted.

It will be understood from the foregoing description that the illustrated embodiment is adapted to transmit the color discrimination code data, and only the run-length code data corresponding to a color or colors of a line of original images, which is/are identified by the color discrimination code data. This arrangement eliminates the conventional requirement for providing a flag code preceding the red image run-length code data, for indicating that the run-length code data represent red images, even where the red image run-length code data and the white image run-length code data are transmitted alternately. Thus, the volume of the data to be transmitted can be reduced in the present arrangement, as compared with that in the conventional arrangement.

Where the line of original images including black and red images on a white background as indicated in FIG. 15(1) is coded into code data suitable for transmission according to the method disclosed in the laid-open publication 57-119567 of unexamined Japanese Patent Application identified before, at least 11 codes are necessary for the transmission to the remote facsimile receiver. The same method may require more than 11 codes, depending upon the manner in which the flag codes are formulated. The method according to the illustrated embodiment of FIGS. 15(3) requires 11 codes. Thus, the illustrated embodiment provides at least the same advantage in terms of the required volume of data to be transmitted.

Further, the illustrated embodiments of FIGS. 15, 17 and 18 are all adapted to transmit the color discrimination code data "e" prior to the transmission of the run-length code data, whereby the remote facsimile receiver can recognize the required data processing operations, before it receives the run-length code data. Accordingly, the data processing in the facsimile receiver for the image reproduction can be simplified.

The illustrated embodiments provide a further advantage, since the yellow and red scan signals "a", "b" as obtained by the photo-electric converter 78 are not transmitted. That is, the scan signals "a", "b" are first converted by the signal converter 150 into the corresponding black and red image signals "c", "d", and then the image signals "c", "d" are coded into the corresponding run-length code data for transmission to the remote facsimile receiver 146. This arrangement permits the facsimile receiver 146 to start decoding the run-length codes one after another as the receiver receives the codes, rather than waiting until the run-length codes of the entire line of images have been received. Accordingly, the required time for decoding the run-length codes can be considerably reduced.

If the decoding is started after the run-length codes of the entire line of images have been received, the color discrimination code need not precede the run-length code data, and may follow the last run-length code.

The yellow and red scan signals "a" and "b" may be directly coded into the run-length code data for transmission from the transmitter to the receiver. In this case, the receiver may convert the received and decoded run-length code data, into black and red image signals "c" and "d" as indicated in FIG. 15(3). However, this conversion may be eliminated, depending upon the manner in which the recording is effected.

The yellow scan signals "a" are the signals which deal with the black and red images in the same manner, and may be considered to be black/red image signals. The red scan signals "b" are identical with the black image signals "c". In this sense, the illustrated embodiments are adapted to transmit in series the black/red image signals and the black image signals.

The yellow and red scan signals "a" and "b" used in the above embodiments may be replaced by black-red image signals "c'" and red image signals "d", as indicated in FIG. 19(1) through 19(3), which are coded into corresponding run-length code data for transmission.

In essence, where the subject copy involves three colors including the background color, the facsimile transmitter scans each line of the subject copy, so as to prepare first image signals which distinguish two of the three colors from the other third color, and second image signals which distinguish a combination of two colors of the three colors which combination is different from the combination of the two colors of the first image signals, from the other color. The transmitter is further adapted to prepare the color discrimination code data which are indicative of the color or colors included in the scanned line of images. The first image signals, and/or the second image signals are coded into corresponding run-length code data, if the first and/or second image signals are necessary for reproducing the original images which involve only one color, or two or three colors. For instance, only the first image signals are coded into the run-length code data, which is transmitted together with the appropriate color discrimination code data.

The color discrimination code is not limited to the one specified above, and may be modified as indicated below, for example:
1: Both red and black images are present.
01: Red images are present, but no black images are present.
00: Black images are present, but no red images are present. (This code is also used where no black and-/or red images are present on a white background.)

The principle of the present invention whose embodiments have been illustrated above is applicable to the transmission of original images which involve four or more colors (including the background color). For instance, where a subject copy includes black, red and blue images on a white background, a three-bit color discrimination code is used in the form of: 111; 110; 101; 100; 011; 010; 001; and 000. Further, there are prepared, for each line of images, three sets of run-length code data which correspond to the three colors except the background color and which are converted or convertible into image signals corresponding to the above-indicated three colors. Of these three sets of run-length code data for each line of images, only the set or sets of run-length code data corresponding to the color or colors actually included in that line is/are transmitted together with the color discrimination code data.

While the facsimile receiver 146 shown in FIG. 14 belongs to a remote facsimile apparatus, the facsimile apparatus 12 of FIGS. 1-13 also has the receiver including the recording device 32, in addition to the transmitter including the reading device 30, as described above. Therefore, the facsimile apparatus 12 is capable of transmitting a desired subject copy to a remote facsimile receiver and receiving a subject copy from the remote receiver. Further, the facsimile apparatus 12 may be used as a copying apparatus. In this case, the subject copy sheet 36 is placed on the sheet support 26, and the original images are read by the shuttle type reading head 50. The image data produced from the comparator section 84 of the photo-electric converter 78 are stored in the read data memory of the RAM of the control computer. These image data are a series of data which does not sequentially correspond to the reading spots from one end of the scanned line of original images to the other end. Therefore, the image data stored in the read data memory are converted by vertical and horizontal converter gate arrays, into a series of line data indicative of the reading spots from one end to the other end of the scanned line. The line data is stored in a record data memory of the RAM. Based on this line data, the recording device 32 is operated to record the corresponding line of images on the thermo-sensitive web 112. At this time, a roll of the suitable web 112 corresponding to the recording mode ("BLACK" or "BLACK AND RED" mode) should be set on the roll holder 110, and the mode selector switch 140 should be placed in the corresponding one of the two positions, so that the recording is performed in the desired mode selected by the switch 140.

As previously described, the mode selector switch 140 provided exclusively for selecting the mode of operation of the recording device 32 is provided on the lower casing 14, which is separate from the control panel 18 on which the numeral pushbuttons 22 and the transmission/reception pushbuttons 24 are provided. Therefore, the selector switch 140 may not be operated by mistake, during an operation on the control panel 18. Further, the exclusive use of the selector switch 140 for designating the type of the web 112 avoids erroneous operation of the switch for other purposes.

Since the sheet presser member 42 fixed to the pivotable control panel 18 can be moved away from the reading head 50 of the reading device 30 by pivoting the control panel 18 to its open position, the reading head 50 is easily accessible, for removing the jammed subject copy sheet 36 or cleaning the head 50, for example.

Similarly, the recording head 122 fixed to the top cover 20 can be readily accessed by opening the top cover 20 for cleaning purposes to remove paper dust or other foreign matter deposited on the head. Further, the instant facsimile apparatus 12 wherein the opening 17 is closed by the two members, i.e., control panel 18 and top cover 20, is advantageous for increased mental stability of the operator, as compared with an arrangement in which the opening 17 was covered by one member. Namely, when the control panel 18 or top cover 20 is opened, only the portion of the interior structure of the apparatus 12 to which the operator wishes to obtain an access can be seen. If the entire interior structure could be seen by opening a member which closes the opening 17, the operator is more likely to feel uneasy about the complicated interior structure.

While the mode selector switch 140 is a slide switch linearly movable between the two positions, the switch may be replaced by a plurality of touch switches or a rotary switch, or even by a variable resistor or other suitable means for selecting the mode of the recording device.

In the facsimile apparatus 12, the subject copy sheet 36 is read or scanned by the reading device 30, by using yellow and red beams, and the recording is effected by the recording device 32 in two different modes. However, the principle of the present invention is applicable to a facsimile apparatus or other recording apparatus in which blue light beams are further used to read three or more colors other than the background color. In this case, the thermo-sensitive recording medium has a corresponding number of coloring layers.

It will be understood that the present invention may be embodied with various other changes, modifications and improvements, which may occur to those skilled in the art.

What is claimed is:

1. A facsimile apparatus, comprising:
   a transmitter for transmitting first original images on a first subject copy sheet having at least one line of images, to a receiver of a remote facsimile apparatus, said first original images having at least two colors other than a background color of said first subject copy sheet, said transmitter including (a) means for determining reading spots along said each line of the subject copy sheet, (b) means for querying said receiver to determine whether said receiver is capable of recording red images, (c) means for scanning each of said at least one line of images on said first subject copy sheet with at least one light beam other than a red light beam, thereby preparing first scan signals which have levels of "1" when the scanned spots are red or black and levels of "0" when the scanned spots are white, (d) means for encoding said first scan signals into a corresponding set of run-length code data, when said receiver is not capable of reproducing red images, and (e) means for transmitting said corresponding set of run-length code data to said receiver of said remote facsimile apparatus to reproduce said each line of the first subject copy sheet; and
   a receiver receiving from said remote facsimile apparatus run-length code data of second original images on a second subject copy sheet having at least one line of images, said receiver of the claimed apparatus being operable to reproduce each of said at least one line of images on said second subject copy sheet based on the run-length code data of said second subject copy sheet.

2. A facsimile apparatus according to claim 1, wherein said transmitter comprises a reading device which includes said means for scanning and which has three modes of operation consisting of a black and red mode wherein black images and red images of said first original images are read as distinguished from each other, a black mode wherein red images as well as black images are read as black images, and a red ignore mode wherein black images are read while red images are not red.

3. A facsimile apparatus according to claim 1, wherein said receiver of the claimed apparatus includes a recording device operable to effect a recording of each line of said second subject copy sheet on a recording medium, selectively in different modes depending upon a selected one of a plurality of types of said recording medium, said claimed facsimile apparatus further comprising:
   a body having an opening through which said recording medium is installed and removed;
   a covering member movable between a closed position in which said covering member closes said opening, and an open position in which said opening is open;
   said body including a portion located near said opening, which portion is covered by said covering member when it is placed in said closed position and exposed when said covering member is placed in said open position; and
   an operator-controlled member provided on said portion of said body for placing said recording device in one of said different modes which corresponds to said selected type of the recording medium.

4. A facsimile apparatus according to claim 1, wherein when said receiver is capable of recording red images, said means for scanning scans said each line of original images on the subject copy sheet with red light beams, to thereby prepare second scan signals which have levels of "1" when the scanned spots are black, and levels of "0" when the scanned spots are white or red, and the claimed facsimile apparatus further comprises means operable when said receiver is capable of recording red images, for preparing, from said first scan signals and said second scan signals, color discrimination code signals indicative of at least one of said three colors which appeared in said each line of said subject copy sheet,
   and wherein said receiver is capable of reproducing red images, said means for encoding encodes only those first scan signals and second scan signals which are necessary to reproduce said each line of original images, into a corresponding set or sets of run-length code data, and said means for transmitting transmits and color discrimination code data and said corresponding set or sets of run-length code data, said receiver being operated to reproduce said each line of the subject copy sheet, based on said color discrimination code data and said set or sets of run-length code data received from said transmitter.

5. A facsimile apparatus according to claim 4, wherein said three colors consist of white, red and black, and further comprising the step of preparing black-red image signals such that the levels of said black-red image signals are "1" when at least one of the levels of said first and second scan signals is "138 , and are "0" in all other cases, and red image signals such that the levels of said red image signals are "1" when the levels of said first and second scan signals are "1" and "0", respectively, and are "0" in all other cases, said sets of run-length code data and said color discrimination code data being prepared based on said black-red image signals and said red image signals.

6. A recording apparatus, comprising:
a recording device operable to effect a recording on a recording medium, selectively in different modes depending upon a selected one of a plurality of types of said recording medium;
a body having an opening through which said recording medium is installed and removed;
a covering member movable between a closed position in which said covering member closes said opening, and an open position in which said opening is open;
said body including a portion located near said opening, which portion is covered by said covering member when it is placed in said closed position, and exposed when said covering member is placed in said open position; and
an operator-controlled member provided on said portion of said body, for placing said recording device in one of said different modes which correspond to said selected type of the recording medium.

7. A recording apparatus according to claim 6 wherein said recording device includes a recording head attached to said covering member, and a platen positioned within said body for supporting the recording medium, said recording head is operable to effect said recording on said recording medium supported by said platen while said covering member is placed in said closed position, said covering member and said recording head permitting an access to said recording medium while said covering member is placed in said open position.

8. A recording apparatus according to claim 6 wherein said opening is open upwardly and which includes a part through which said recording medium is installed and removed, and said covering member which is normally placed in said closed position to close said part of said opening, the claimed apparatus further comprises an operation panel which covers another part of said opening and which controls the claimed apparatus, said covering member is supported by said body pivotally between said closed and open position, and said operation panel being supported by said body pivotally between a first position in which said another part of said opening is closed and a second position in which said another part of said opening is open.

9. A method of transmitting a subject copy bearing at least one line of original images having three colors, from a transmitter to a receiver, said method comprising the steps of:
determining reading spots along each line of the subject copy sheet;
operating said transmitter to query said receiver to determine whether said receiver is capable of recording red images; and
operating said transmitter to scan each of said at least one line of original images on the subject copy sheet with light beams other than red light beams to thereby prepare first scan signals which have levels of "1" when the scanned spots are red or black and levels of "0" when the scanned spots are white;
when said receiver is not capable of reproducing red images, encoding said first scan signals into corresponding set of run-length code data and transmitting said corresponding set of run-length code data from said transmitter to said receiver to operate said receiver to reproduce said each line of the subject copy sheet based on said corresponding set of run-length code data received from said transmitter.

10. A method according to claim 9, wherein when said receiver is capable of recording red images, said method further comprises the steps of:
operating said transmitter to scan said each line of original images on the subject copy sheet with red light beams, to thereby prepare scan signals which have levels of "1" when the scanned spots are black, and levels of "0" when the scanned spots are white or red;
operating said transmitter to prepared, from said first scan signals and said second scan signals, color discrimination code signals indicative of at least one of said three colors which appeared in said each line of said subject copy sheet; and
encoding only those first scan signals and second scan signals which are necessary to reproduce said each line of original images, into a corresponding set or sets of run-length code data, and transmitting with said color discrimination code data and said corresponding set or sets of run-length code data, said receiver being operated to reproduce each line of the subject cop sheet based on said color discrimination code data and said set or sets of run-length code data received from said transmitter.

11. A method according to claim 10, wherein said three colors consist of white, red and black, and further comprising the step of preparing black-red image signals such that the levels of said first and second scan signals is "1", and "0" in all other cases, and red image signals such that the levels of said red image signals are "1" when the levels of said first and second scan signals are "1" and "0" respectively, and are "0" in all other cases, said sets of run-length code data and said color discrimination code data being prepared based on said black-red image signals and said red image signals.

12. A method of transmitting a subject copy bearing at least one of original images having white, red and black colors, from a transmitter to a receiver, said method comprising the steps of:
determining reading spots along each line of the subject copy sheet;
operating said transmitter to scan each of said at least one line of original images on the subject copy sheet with light beams other than red light beams to thereby prepare first scan signals which have levels of "1" when the scanning spots are red or black and levels of "0" when the scanned spots are white;
operating said transmitter to scan said each line of original images with red light beams to thereby prepare second scan signals which have levels of "1" when the scanned spots are black and levels of "0" when the scanned spots are white or red;
operating said transmitter to prepare color discrimination code data indicative of at least one of said white, black and red colors which appeared in said each line of said subject copy sheets;
preparing black-red image signals such that the levels of said black-red image signals are "1" when at least one of the levels of said first and second scan signals is "1", and are "0" in all other cases, and red image signals such that the levels of said red image signals are "1" when the levels of said first and second scan signals are "1" and "0" respectively, and are "0" in all other cases;

encoding only those black-red image signals and red image signals which are necessary to reproduce said each line of original images into a corresponding set or sets of run-length code data; and transmitting said corresponding set or sets of run-length code data for said each line of original images, from said transmitter to said receiver, to operate said receiver to reproduce said each line of the subject copy sheet based on said color discrimination code data and said corresponding set or sets of run-length code data which are received from said transmitter.

13. An image reading apparatus, comprising:
a body having an opening;
a reading device including a reading head accommodated with said opening and operable to read images on a subject copy sheet, said reading device further including a sheet presser member for holding said subject copy sheet;
a feeding device for feeding said subject copy sheet relative to said reading head and said sheet presser member;
an operation panel for controlling said reading device, said operation panel being supported by said body pivotally between a closed position in which said opening is closed and an open position in which said opening is open; and
said sheet presser member being attached to an inside of said operation panel, such that said sheet presser member is stationary with respect to said reading head and contacts only a portion of said subject copy sheet facing said reading head while said operation panel is placed in said closed position and while said subject copy sheet is fed relative to said sheet presser member, said operation panel and said sheet presser member permitting access to said subject copy sheet and said reading device while said operation panel is placed in said open position.

14. An image reading apparatus according to claim 13, wherein said body has another opening, and said image reading apparatus further comprises:
a covering member movable between a closed position in which said another opening is closed and an open position in which said another opening is open; and
a recording device for effect a recording on a recording medium accommodated within said another opening, said recording device including a recording head, and a platen accommodated within said another opening, said recording head being attached to an inside of said covering member, and positioned within said another opening, to effect said recording medium supported by said platen while said covering member is placed in said closed position, said covering member and said recording head permitting access to said recording medium while said covering member is placed in said open position.

15. An image reading apparatus, comprising:
a body;
a reading device including reading means accommodated within said body and operable to read original images on an image-bearing surface of a subject copy sheet;
a sheet support member which forms a part of said body and on which said subject copy sheet is placed such that said image-bearing surface faces said sheet support member, said sheet support member having a sheet support portion on which said subject copy sheet is slidably fed toward said reading device; and
said sheet support member being provided with a plurality of ribs which are formed parallel to a feeding direction in which said subject copy sheet is fed to be read by said reading means, said ribs being formed over an entire length of said sheet support portion of said sheet support member as seen in said feeding direction.

16. An image reading apparatus according to claim 15, wherein said body has an opening, and said reading device includes a reading head accommodated within said opening and operable to read images on said subject copy sheet, said reading device further including a sheet presser member for holding said subject copy sheet, said claimed image reading apparatus further comprising:
an operation panel for controlling said reading device, said operation panel being supported by said body pivotally between a closed position in which said opening is closed and an open position in which said opening is open; and
said sheet presser member being attached to an inside of said operation panel such that said sheet presser member holds said subject copy sheet is pressed contact with said reading head while said operation panel is placed in said closed position, said operation panel and said sheet presser member permitting an access to said subject copy sheet while said operation panel is placed in said open position.

17. An image reading apparatus according to claim 15, wherein said body has another opening, and said image reading apparatus further comprises:
a covering member movable between a closed position in which said another opening is closed and an open position in which said another opening is open; and
a recording device for effect a recording on a recording medium accommodated within said another opening, said recording device including a recording head and a platen accommodated within said another opening, said recording head being attached to an inside of said covering member, and positioned within said another opening, to effect said recording medium supported by said platen while said covering member is placed in said closed position, said covering member and said recording head permitted access to said recording medium while said covering member is placed in said open position.

18. An image reading apparatus according to claim 15, wherein the image reading apparatus serves as a part of a facsimile apparatus, the image reading apparatus further comprising:
a transmitter for receiving the signal outputted by said reading means and for preparing a plurality of sets of run-length code data corresponding to said original images and for transmitting said code data to a receiver of a remote facsimile apparatus.

19. An image reading apparatus according to claim 15, wherein said sheet support portion of said sheet support member is disposed adjacent to said reading means of said reading device.

20. An image reading apparatus according to claim 15, wherein said sheet support portion has a contact area provided by said ribs for contact with said subject copy sheet and a non-contact area in which said ribs are not provided, said contact area being smaller than said non-contact area.

21. An image reading apparatus comprising:
a body having an opening;
a reading device having a portion accommodated within said opening and operable to read images on a subject copy sheet, said reading device including a sheet presser member for holding said subject copy sheet;
a feeding device for feeding said subject copy sheet relative to said reading device and said sheet presser member;
an operation panel for controlling said reading device, said operation panel being supported by said body pivotally between a closed position in which said opening is closed and an open position in which said opening is open; and
said sheet presser member being attached to an inside of said operation panel, such that said sheet presser member is stationary with respect to said reading device and holds said subject copy sheet while said operation panel is placed in said closed position and while said subject copy sheet is fed relative to said sheet presser member, said operation panel and said sheet and said portion of said reading device while said operation panel is placed in said open position.

22. An image reading apparatus according to claim 21, wherein said body further has a second opening, said apparatus further comprising a recording device for effecting a recording on a recording medium, a medium supply accommodated in said second opening for supplying said recording medium to said recording device, and a covering member supported by said body pivotally between a closed position in which said second opening is closed and an open position in which said second opening is open.

23. An image reading apparatus according to claim 22, further comprising a ribbed member having a surface facing said subject copy sheet in a feed path through which said subject copy sheet is fed past said reading device, said ribbed member having a plurality of ribs formed on said surface thereof so as to extend in a direction in which said subject copy sheet is fed to be read by said reading device.

24. An image reading apparatus according to claim 21, further comprising a ribbed member having a surface facing said subject copy sheet in a feed path through which said copy sheet is fed past said reading device, said ribbed member having a plurality of ribs formed on said surface thereof so as to extend in a direction in which said subject copy sheet is fed to be read by said reading device.

25. An image reading apparatus, comprising:
a body having an opening;
a feeding device for feeding a subject copy sheet;
a reading device having a portion accommodated within said opening and operable to read images on said subject copy sheet while the subject copy sheet is fed by said feeding device, said reading device including a sheet presser member for holding said subject copy sheet while the subject copy sheet is moved relative to said sheet presser member;
an operation panel for controlling said reading device, said operation panel being supported by said body pivotally between a closed position in which said opening is closed and an open position in which said opening is open; and
said sheet presser member being stationary with respect to said reading device and holding said subject copy sheet in contact with a surface thereof while said operation panel is placed in said closed position and while said subject copy sheet is fed relative to said sheet presser member.

26. An image reading apparatus according to claim 25, wherein said body further has a second opening, said apparatus further comprising a recording device for effecting a recording on a recording medium, a medium supply accommodated in said second opening for supply said recording medium to said recording device, and a covering member supported by said body pivotally between a closed position in which said second opening is closed and an open position in which said second opening is open.

27. An image reading apparatus according to claim 26, further comprising a ribbed member having a surface facing said subject copy sheet in a feed path through which said subject copy sheet is fed past said reading device, said ribbed member having a plurality of ribs formed on said surface thereof so as to extend in a direction in which said subject copy sheet is fed to by read by said reading device.

28. An image reading apparatus according to claim 26, wherein said recording device includes a recording head attached to an inside of said covering member.

29. An image reading apparatus according to claim 25, further comprising a ribbed member having a surface facing said subject copy sheet in a feed path through which said subject copy sheet is fed past said reading device, said ribbed member having a plurality of ribs formed on said surface thereof so as to extend in a direction in which said subject copy sheet is fed to be read by said reading device.

30. An image reading apparatus, comprising:
a reading device for reading original images on a subject copy sheet; and
a ribbed member having a surface facing said subject copy sheet and defining a part of a feed path through which said subject copy sheet is fed past said reading device, said surface of said ribbed member having a sheet support portion on which said subject copy sheet is slidably fed toward said reading device, said ribbed member having a plurality of ribs formed on said surface thereof so as to extend in a feeding direction in which said subject copy sheet is fed to be read by said reading device, said ribs being formed over an entire length of said sheet support portion as seen said feeding direction.

31. An image reading apparatus according to claim 30, wherein said reading device includes a sheet presser member for holding said subject copy sheet in contact therewith.

32. An image reading apparatus according to claim 30, further comprising a body having an opening in which said reading device is at least partially accommodated, and wherein said ribbed member consists of a pivotable member supported by said body, said pivotable member having a ribbed surface which at least partially defines a portion of said feed path which leads to said reading device.

33. An image reading apparatus according to claim 30, further comprising:
a recording device for effecting a recording on a recording medium;
a medium supply for supplying said recording medium to said recording device;

a first pivotable covering member for covering said reading device; and a second pivotable covering device for covering said medium supply.

34. An image reading apparatus according to claim 33, further comprising a body having a first opening in which said reading device is at least partially accommodated, and a second opening in which said medium supply is accommodated, said first pivotable covering member closing said first opening and said second pivotable covering member closing said second opening.

35. An image reading apparatus according to claim 34, wherein said first covering member provides an operation panel for controlling said reading device.

36. An image reading apparatus according to claim 34, wherein said recording device includes a recording head attached to an inside of said second covering member.

37. An image reading apparatus according to claim 30, wherein said sheet support portion of said sheet support member is disposed adjacent to said reading device.

38. An image reading apparatus according to claim 30, wherein said sheet support portion has a contact area provided by said ribs for contact with said subject copy sheet and a non-contact area in which said ribs are not provided, said contact area being smaller than said non-contact area.

39. An image reading apparatus, comprising:
a reading device for reading original images on a subject copy sheet; and
a ribbed member having a surface facing said subject copy sheet and defining a part of a feed path through which said subject copy sheet is fed past said reading device, said surface of said ribbed member having a sheet support portion adjacent to said reading device, said subject copy sheet being slidably fed toward said reading device on said sheet support portion, said ribbed member having a plurality of ribs formed on said sheet support portion adjacent to said reading device, so as to extend in a feeding direction in which said subject copy sheet is fed to be read by said reading device.

40. An image reading apparatus according to claim 39, wherein said plurality of ribs are formed over a substantially entire length of said sheet support portion of said sheet support member and extend in said feeding direction.

41. An image reading apparatus according to claim 39, wherein said sheet support portion has a contact area provided by said ribs to contact with said subject copy sheet and a non-contact area in which said ribs are not provided, said contact area being smaller than said non-contact area.

42. An image reading apparatus, comprising:
a reading device for reading original images on a subject copy sheet; and
a ribbed member having a surface facing said subject copy sheet and defining a part of a feed path through which said subject copy sheet is fed past said reading device, said surface of said ribbed member having a sheet support portion on which said subject copy sheet is slidably fed toward said reading device, said ribbed member having a plurality of parallel ribs formed on said sheet support portion thereof so as to extend in a feeding direction in which said subject copy sheet is fed to be read by said reading device, said sheet support portion having a contact area provided by said ribs for contact with said subject copy sheet and a non-contact area in which said ribs are not provided, said contact area being smaller than said non-contact area.

43. An image reading apparatus according to claim 42, wherein said plurality of parallel ribs consist of parallel protrusions spaced apart from each other, in a direction perpendicular to said feeding direction, for line contact with said subject copy sheet while said subject copy sheet is fed in said feeding direction relative to said reading device.

44. An image reading apparatus according to claim 42, wherein said plurality of ribs are formed over a substantially entire length of said sheet support portion of said sheet support member and extend in said feeding direction.

45. An image reading apparatus according to claim 42, wherein said sheet support portion of said sheet support member is disposed adjacent to said reading device.

* * * * *